US009380520B2

(12) United States Patent
Lee et al.

(10) Patent No.: US 9,380,520 B2
(45) Date of Patent: Jun. 28, 2016

(54) USING MOTION TO IMPROVE LOCAL WIRELESS NETWORK CONNECTIVITY

(71) Applicant: QUALCOMM Incorporated, San Diego, CA (US)

(72) Inventors: Jin Won Lee, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 13/937,163

(22) Filed: Jul. 8, 2013

(65) Prior Publication Data

US 2014/0274044 A1 Sep. 18, 2014

Related U.S. Application Data

(63) Continuation-in-part of application No. 13/800,431, filed on Mar. 13, 2013.

(51) Int. Cl.
*H04W 4/00* (2009.01)
*H04W 48/16* (2009.01)
*H04W 52/02* (2009.01)
*H04W 84/12* (2009.01)
*H04W 48/04* (2009.01)

(52) U.S. Cl.
CPC .......... *H04W 48/16* (2013.01); *H04W 52/0254* (2013.01); *H04W 48/04* (2013.01); *H04W 84/12* (2013.01)

(58) Field of Classification Search
None
See application file for complete search history.

(56) References Cited

U.S. PATENT DOCUMENTS

| 4,841,329 A | 6/1989 | Kasamura et al. |
| 6,208,861 B1 | 3/2001 | Suzuki |
| 6,668,172 B1 | 12/2003 | Yoshimura |
| 6,714,983 B1 | 3/2004 | Koenck et al. |

(Continued)

FOREIGN PATENT DOCUMENTS

| EP | 0903951 A2 | 3/1999 |
| EP | 1096698 A2 | 5/2001 |

(Continued)

OTHER PUBLICATIONS

International Search Report and Written Opinion—PCT/US2014/025614—ISA/EPO—Aug. 27, 2014.

(Continued)

*Primary Examiner* — Daniel Lai
(74) *Attorney, Agent, or Firm* — Muncy, Geissler, Olds & Lowe, P.C.

(57) ABSTRACT

The disclosure is directed to using motion to reduce unnecessary scans for local wireless networks. An aspect determines whether or not a motion state change event of a user device indicates a change from a moving motion state to a stationary motion state, and if the motion state change event indicates a change from a moving motion state to a stationary motion state, ignoring the motion state change event. An aspect of the disclosure is directed to using motion to reduce latency of scanning for local wireless networks. An aspect determines whether or not a user device is in motion, determines whether or not a periodic scan timer has expired and/or a received signal strength indicator (RSSI) is below a threshold, and if the user device is in motion and the periodic scan timer has expired or the RSSI is below the threshold, scanning for a local wireless network.

30 Claims, 14 Drawing Sheets

(56) References Cited

U.S. PATENT DOCUMENTS

| | | |
|---|---|---|
| 6,760,362 B2 | 7/2004 | Patel et al. |
| 7,149,518 B2 | 12/2006 | Attimont et al. |
| 7,257,417 B1 | 8/2007 | Krasner |
| 7,420,947 B2 | 9/2008 | Sendonaris et al. |
| 7,454,209 B2 | 11/2008 | Subrahmanya |
| 7,646,802 B2 | 1/2010 | Black et al. |
| 8,670,425 B1 | 3/2014 | Xue et al. |
| 8,843,181 B2 | 9/2014 | Seibert et al. |
| 2004/0192296 A1* | 9/2004 | Ohmori .......... 455/432.1 |
| 2004/0203812 A1 | 10/2004 | Malladi et al. |
| 2005/0134503 A1 | 6/2005 | Colley et al. |
| 2005/0181734 A1 | 8/2005 | Coutts et al. |
| 2005/0243899 A1 | 11/2005 | Bilgic et al. |
| 2006/0098766 A1 | 5/2006 | Pietraski et al. |
| 2007/0071070 A1 | 3/2007 | Dominique et al. |
| 2007/0091847 A1 | 4/2007 | Lee |
| 2007/0176760 A1 | 8/2007 | Reeves et al. |
| 2007/0184835 A1 | 8/2007 | Bitran et al. |
| 2008/0102774 A1 | 5/2008 | Fratti et al. |
| 2008/0112346 A1 | 5/2008 | Tolpin et al. |
| 2008/0161072 A1 | 7/2008 | Lide et al. |
| 2008/0219208 A1 | 9/2008 | Adams et al. |
| 2009/0073871 A1* | 3/2009 | Ko et al. .......... 370/216 |
| 2009/0098873 A1 | 4/2009 | Gogic |
| 2009/0103503 A1 | 4/2009 | Chhabra |
| 2009/0110049 A1 | 4/2009 | Luschi et al. |
| 2009/0131081 A1 | 5/2009 | Abdel-Kader et al. |
| 2009/0164813 A1 | 6/2009 | Tu et al. |
| 2009/0312014 A1 | 12/2009 | Su et al. |
| 2010/0009643 A1 | 1/2010 | Haartsen |
| 2010/0172274 A1 | 7/2010 | Wu et al. |
| 2010/0248773 A1 | 9/2010 | Rosay et al. |
| 2011/0211511 A1 | 9/2011 | Bakthavathsalu et al. |
| 2011/0299422 A1 | 12/2011 | Kim et al. |
| 2011/0300875 A1 | 12/2011 | Kim et al. |
| 2012/0028635 A1 | 2/2012 | Borg et al. |
| 2013/0084856 A1 | 4/2013 | Prasad et al. |
| 2013/0130694 A1 | 5/2013 | Kherani et al. |
| 2013/0182603 A1 | 7/2013 | Twell |
| 2013/0331087 A1 | 12/2013 | Shoemaker et al. |
| 2014/0004886 A1 | 1/2014 | Gillett et al. |
| 2014/0065974 A1 | 3/2014 | Sane |
| 2014/0073302 A1 | 3/2014 | Trethewey et al. |
| 2014/0274041 A1 | 9/2014 | Lee et al. |
| 2014/0274042 A1 | 9/2014 | Teague et al. |

FOREIGN PATENT DOCUMENTS

| | | |
|---|---|---|
| EP | 1146653 A2 | 10/2001 |
| EP | 1261144 A1 | 11/2002 |
| EP | 1887748 A2 | 2/2008 |
| EP | 2203020 A1 | 6/2010 |
| GB | 2264837 A | 9/1993 |
| GB | 2305825 A | 4/1997 |
| JP | H04373288 A | 12/1992 |
| JP | 5232210 A | 9/1993 |
| JP | H07212299 A | 8/1995 |
| JP | 9098465 A | 4/1997 |
| JP | 11098071 A | 4/1999 |
| JP | 2000261358 A | 9/2000 |
| JP | 2001127692 A | 5/2001 |
| JP | 2003207556 A | 7/2003 |
| JP | 2004159284 A | 6/2004 |
| JP | 2004364124 A | 12/2004 |
| JP | 2006203613 A | 8/2006 |
| JP | 2006229692 A | 8/2006 |
| WO | 03090373 | 10/2003 |
| WO | 04021585 | 3/2004 |
| WO | 2004023672 | 3/2004 |
| WO | 2004075499 A1 | 9/2004 |
| WO | 04109947 | 12/2004 |
| WO | 2008017908 A1 | 2/2008 |
| WO | 2009085893 A2 | 7/2009 |

OTHER PUBLICATIONS

Partial International Search Report—PCT/US2014/025614—ISA/EPO—Jul. 24, 2014.

Kim K-H., et al., "Improving Energy Efficiency of Wi-Fi Sensing on Smartphones," Proceeding of IEEE Infocom, 2011, pp. 2930-2938. Retrieved from URL: http://ieeexplore.ieee.org/xpls/abs_all.jsp?arnumber=5935133.

U.S. Appl. No. 11/958,257, filed Dec. 17, 2007 with the USPTO, Titled, "Method and Apparatus for Establishing a Wireless Network Signal Acquisition Rate," Inventor Douglas Neal Rowitch, Assignee Qualcomm, Incorporated Customer No. 23696.

Buchacher C., et al., "A hybrid equalizer/Rake receiver for the Wideband CDMA Downlink in large delay spread channels", Copernicus Publications on behalf of the URSI Landesausschuss in der Bundesrepublik Deutschland e.V. 2008, XP002617795, Retrieved from the Internet: URL:http://www.adv-radio-sci.net/6/1071200 8/ars-6-107-2008.pdf.

International Preliminary Report on Patentability—PCT/US2010/036214, The International Bureau of WIPO—Geneva, Switzerland, Sep. 15, 2011.

International Search Report and Written Opinion—PCT/US2010/036214, International Search Authority—European Patent Office—Feb. 25, 2011.

Taiwan Search Report—TW099117052—TIPO—May 20, 2013.
Taiwan Search Report—TW099117052—TIPO—Dec. 7, 2013.
Taiwan Search Report—TW102137349—TIPO—Mar. 25, 2015.

* cited by examiner

USING MOTION TO IMPROVE LOCAL WIRELESS NETWORK CONNECTIVITY

REFERENCE TO RELATED APPLICATIONS

The present Application for Patent is a continuation-in-part of patent application Ser. No. 13/800,431, entitled "USING MOTION TO IMPROVE LOCAL WIRELESS NETWORK CONNECTIVITY," filed Mar. 13, 2013, assigned to the assignee hereof and hereby expressly incorporated by reference herein.

The present Application for Patent is related to U.S. patent application Ser. No. 13/800,699, entitled "USING MOTION TO OPTIMIZE PLACE OF RELEVANCE OPERATIONS," filed Mar. 13, 2013, assigned to the assignee hereof, and expressly incorporated herein by reference

BACKGROUND OF THE INVENTION

1. Field of the Invention

The disclosure is directed to using motion to improve local wireless network connectivity.

2. Description of the Related Art

Mobile devices, such as cell phones, smart phones, tablet computers, laptops, personal digital assistants (PDAs), etc., are often capable of connecting to local wireless networks, such as wireless local area networks (WLANs), WiFi networks, Bluetooth networks, etc. Such networks are often used to provide data connectivity for mobile devices. However, maintaining a connection while a mobile device is moving from one geographic area to another can be challenging.

Currently, mobile devices simply perform periodic scans when not-connected, and suppress all scans when connected. When connected, scans are suppressed to save energy, but this can hinder the ability of the device to efficiently find and switch to a better access point (e.g. one with a higher signal-to-noise ratio). When not connected, the rate of scanning is a tradeoff between power consumption and the delay of establishing a connection. This is especially an issue with moving devices where the best access point may be changing relatively quickly. These scans can require significant power, and thus there is an opportunity to use motion information to improve the power performance of the connectivity management.

SUMMARY

The disclosure is directed to using motion to improve local wireless network connectivity. A method for using motion to reduce unnecessary scans for local wireless networks includes determining whether or not a motion state change event of a user device indicates a change from a moving motion state to a stationary motion state, and if the motion state change event indicates a change from a moving motion state to a stationary motion state, ignoring the motion state change event.

A method of using motion to reduce latency of scanning for local wireless networks includes determining whether or not a user device is in motion, determining whether or not a periodic scan timer has expired and/or a received signal strength indicator (RSSI) is below a threshold, and if the user device is in motion and the periodic scan timer has expired or the RSSI is below the threshold, scanning for a local wireless network.

An apparatus for using motion to reduce unnecessary scans for local wireless networks includes logic configured to determine whether or not a motion state change event of a user device indicates a change from a moving motion state to a stationary motion state, and logic configured to ignore the motion state change event if the motion state change event indicates a change from a moving motion state to a stationary motion state.

An apparatus for using motion to reduce latency of scanning for local wireless networks includes logic configured to determine whether or not a user device is in motion, logic configured to determine whether or not a periodic scan timer has expired and/or a received signal strength indicator (RSSI) is below a threshold, and logic configured to scan for a local wireless network if the user device is in motion and the periodic scan timer has expired or the RSSI is below the threshold.

An apparatus for using motion to reduce unnecessary scans for local wireless networks includes means for determining whether or not a motion state change event of a user device indicates a change from a moving motion state to a stationary motion state, and means for ignoring the motion state change event if the motion state change event indicates a change from a moving motion state to a stationary motion state.

An apparatus for using motion to reduce latency of scanning for local wireless networks includes means for determining whether or not a user device is in motion, means for determining whether or not a periodic scan timer has expired and/or a received signal strength indicator (RSSI) is below a threshold, and means for scanning for a local wireless network if the user device is in motion and the periodic scan timer has expired or the RSSI is below the threshold.

A non-transitory computer-readable medium for using motion to reduce unnecessary scans for local wireless networks includes at least one instruction to determine whether or not a motion state change event of a user device indicates a change from a moving motion state to a stationary motion state, and at least one instruction to ignore the motion state change event if the motion state change event indicates a change from a moving motion state to a stationary motion state.

A non-transitory computer-readable medium for using motion to reduce latency of scanning for local wireless networks includes at least one instruction to determine whether or not a user device is in motion, at least one instruction to determine whether or not a periodic scan timer has expired and/or a received signal strength indicator (RSSI) is below a threshold, and at least one instruction to scan for a local wireless network if the user device is in motion and the periodic scan timer has expired or the RSSI is below the threshold.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Error! Reference source not found. illustrates an exemplary state diagram for scan triggering in a LowRSSI optimization.

Figure 11:
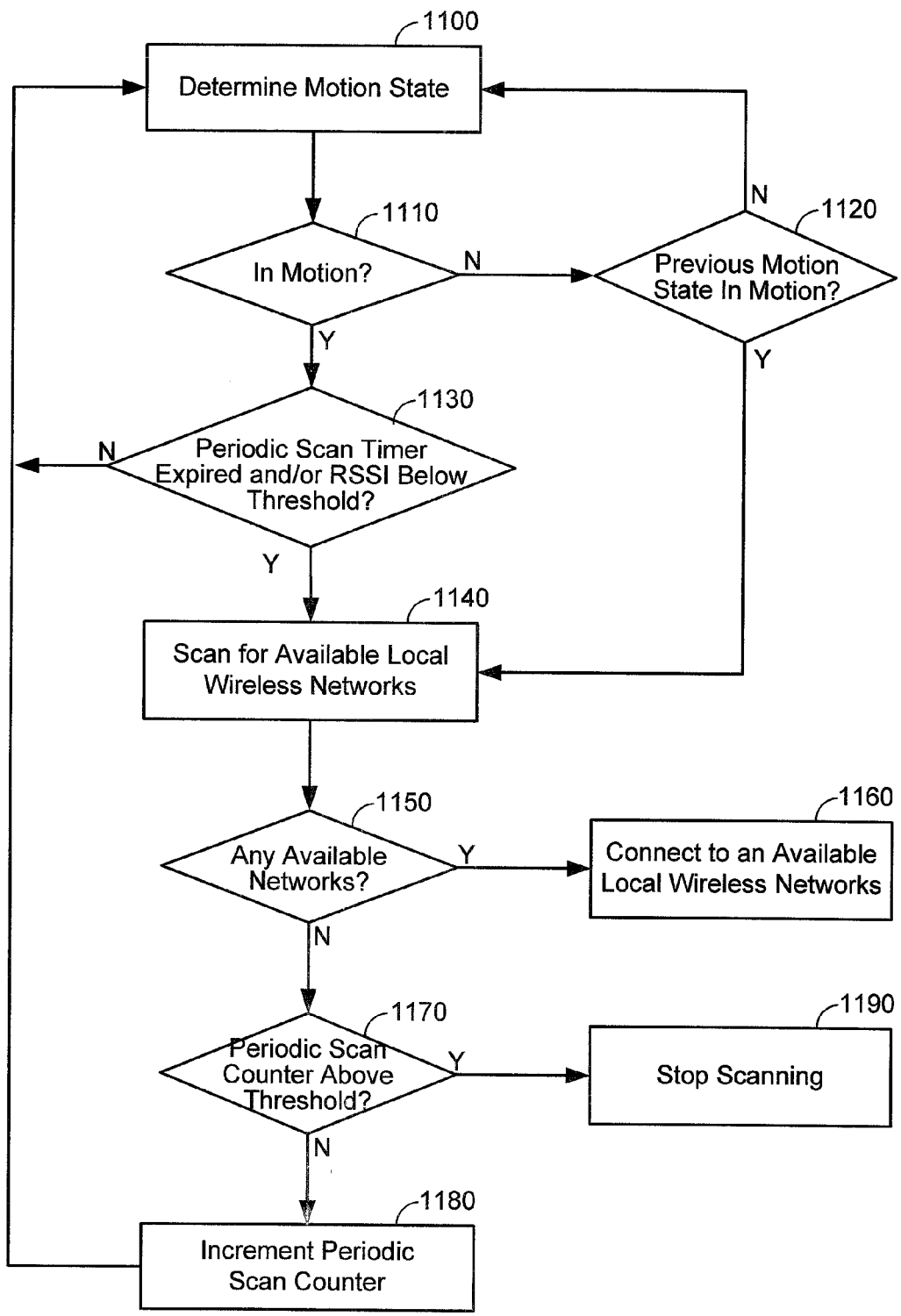

FIG. 11 illustrates an exemplary flow for periodically scanning for available local wireless networks while in an in-motion state.

Figure 12:
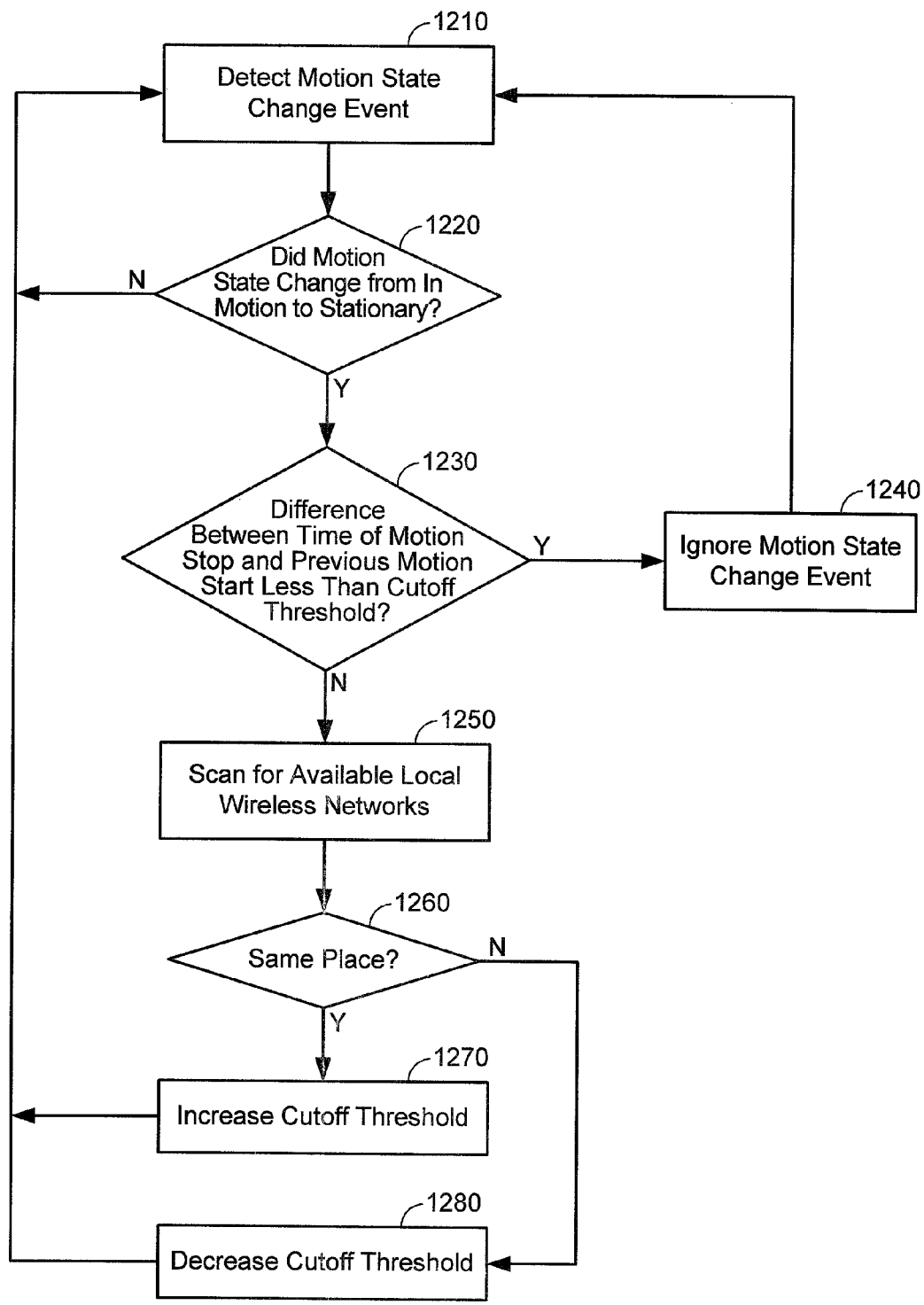

FIG. 12 illustrates an exemplary flow for filtering unnecessary in-motion to stationary motion state change events.

Figure 13:
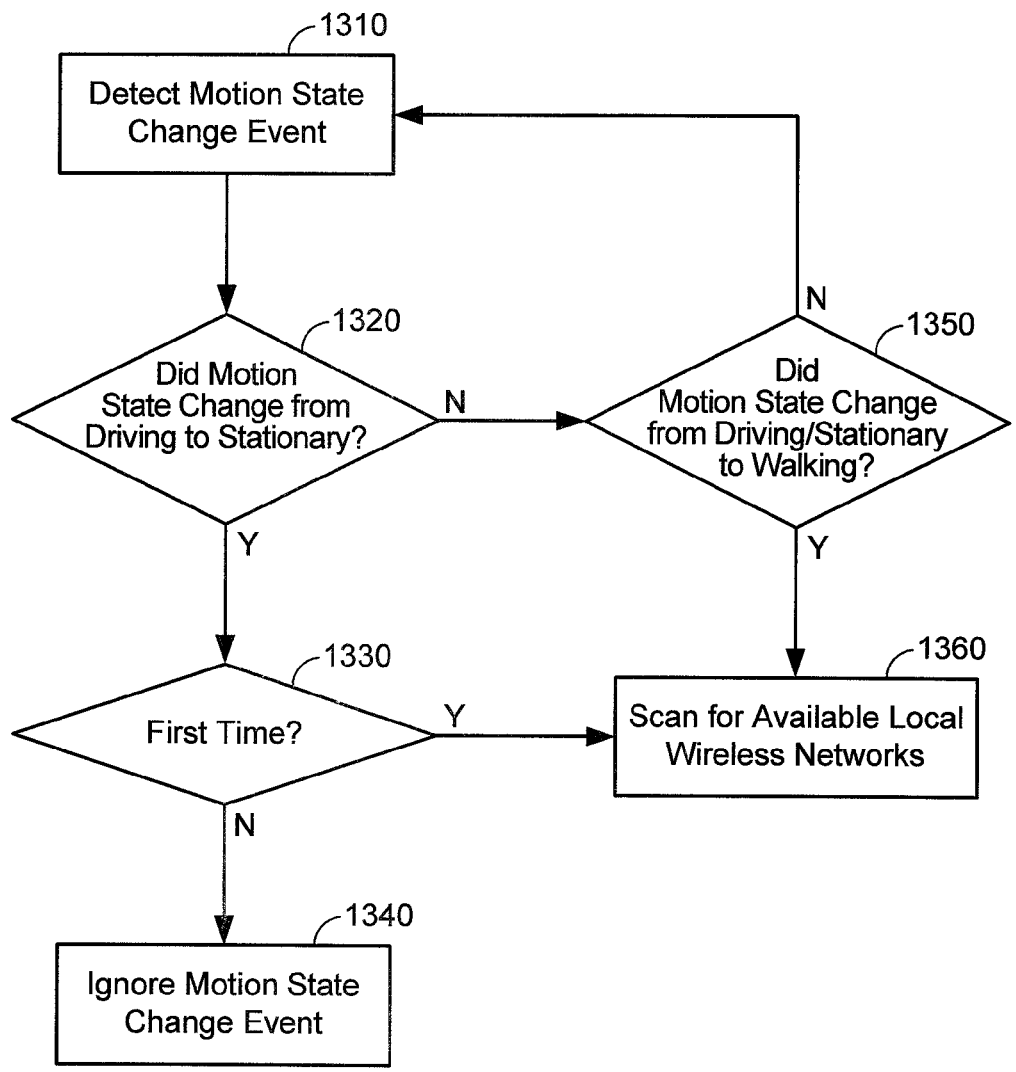

FIG. 13 illustrates an exemplary flow for filtering unnecessary drive to stationary motion state change events.

Figure 14:
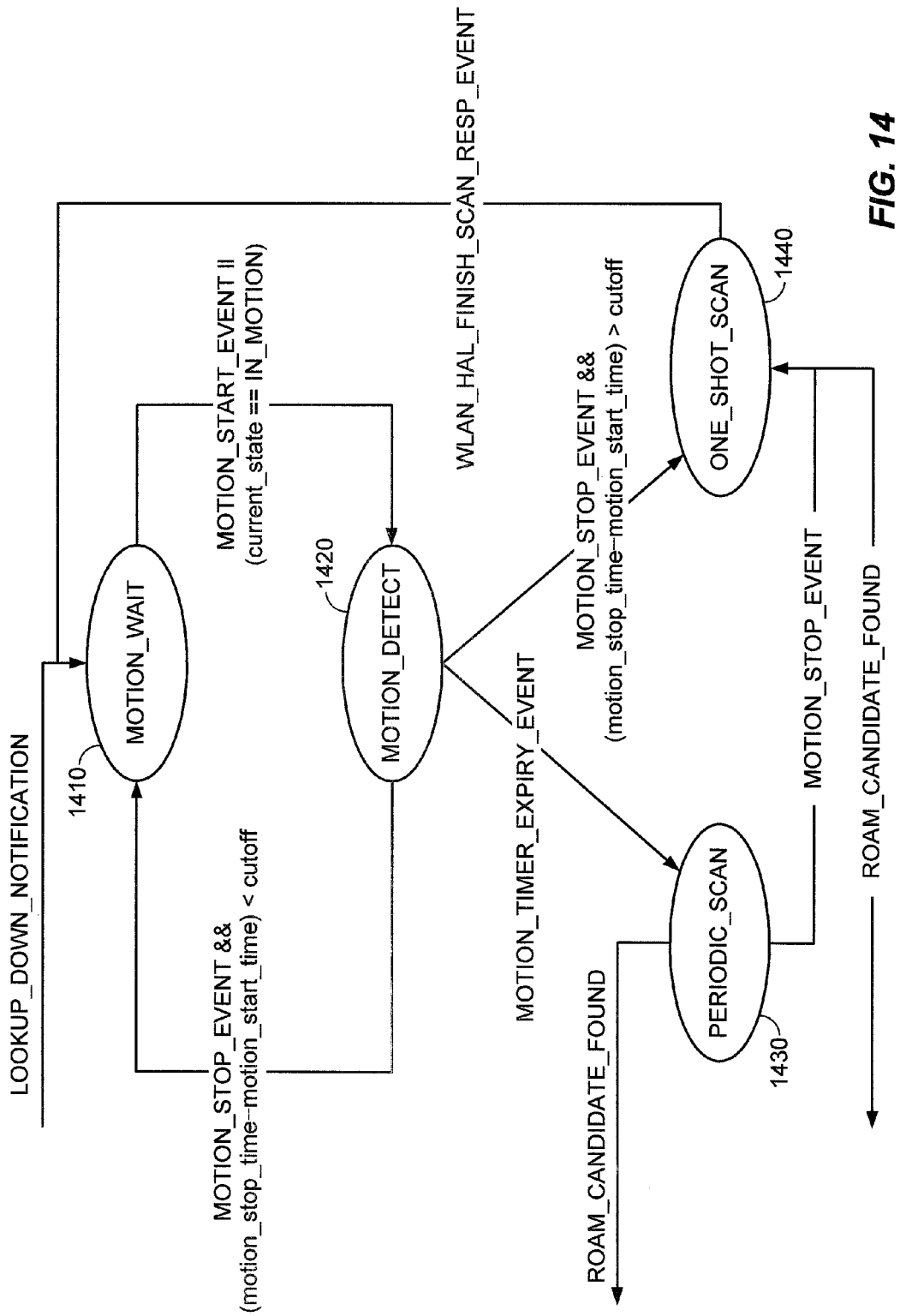

FIG. 14 illustrates an exemplary state diagram for using motion to reduce unnecessary scans for local wireless networks.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Figure 1:
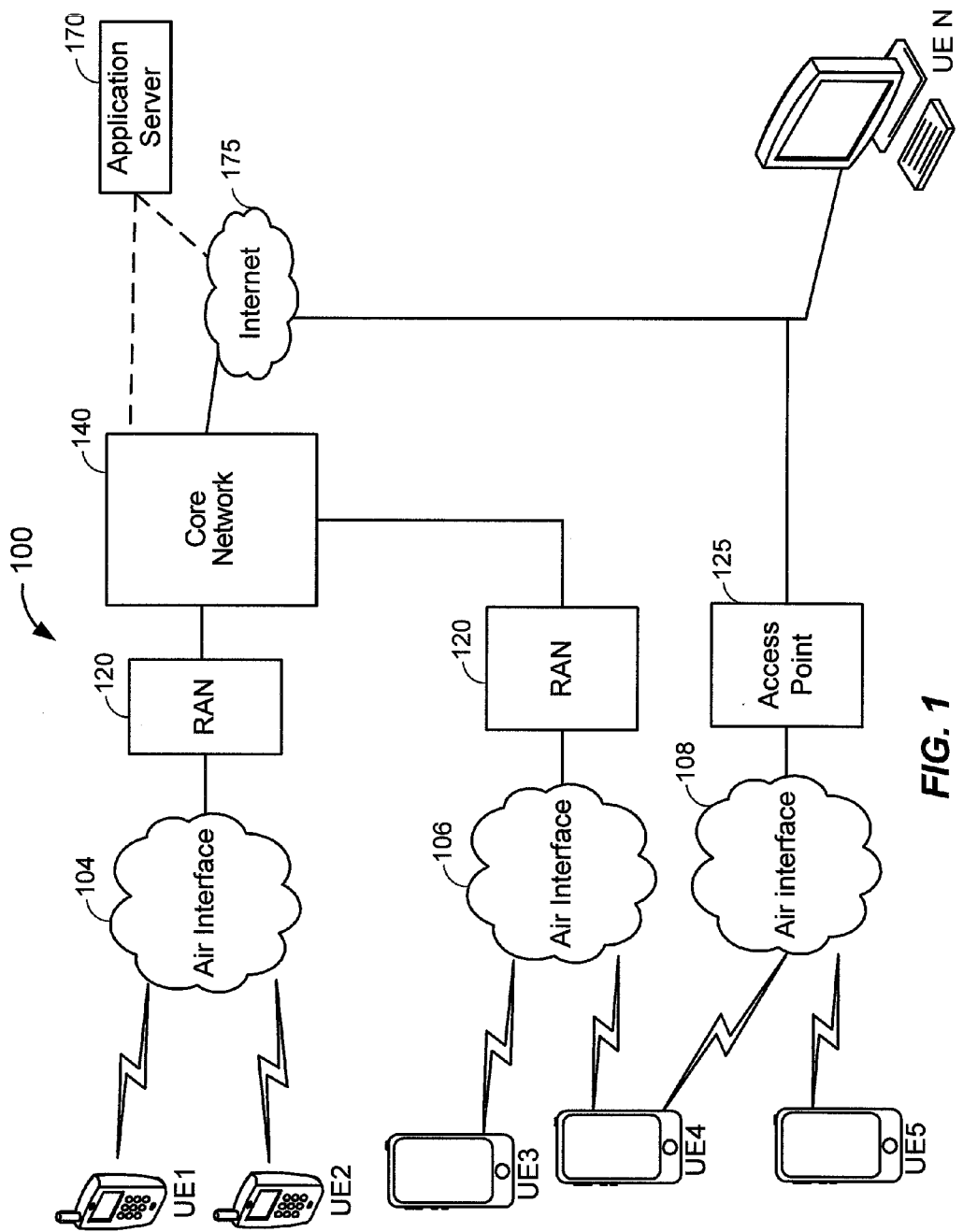
FIG. 1 illustrates a high-level system architecture of a wireless communications system in accordance with an aspect of the disclosure.

FIG. 1 illustrates a high-level system architecture of a wireless communications system 100 in accordance with an aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touch-screen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Evolution-Data Optimized (EV-DO), Evolved High Rate Packet Data (eHRPD), Global System of Mobile Communication (GSM), Enhanced Data rates for GSM Evolution (EDGE), Wideband CDMA (W-CDMA), Long-Term Evolution (LTE), etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Figure 2:
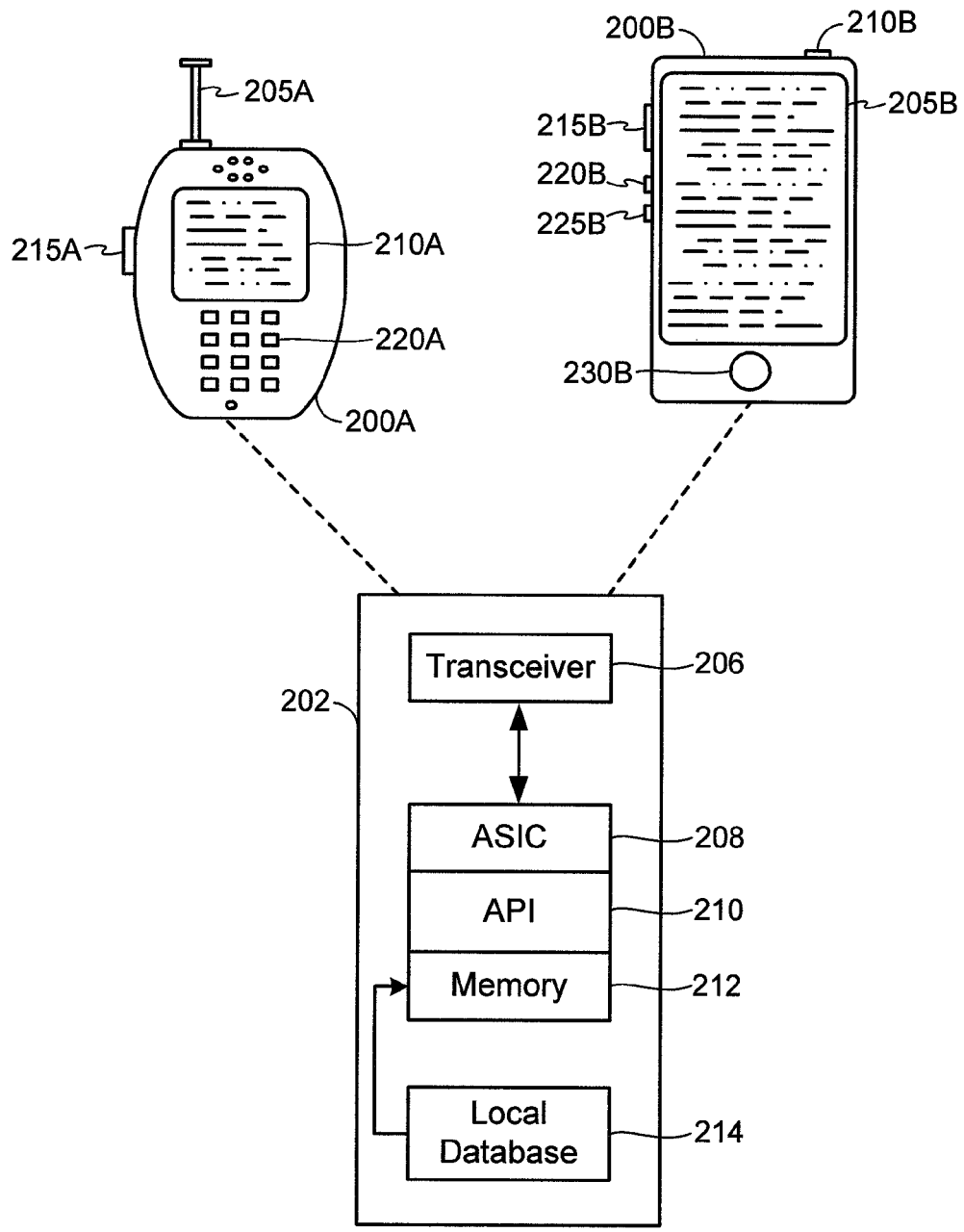
FIG. 2 illustrates examples of user equipments (UEs) in accordance with aspects of the disclosure.

FIG. 2 illustrates examples of UEs in accordance with aspects of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only memory (ROM) or random-access memory (RAM), electrically erasable programmable ROM (EEPROM), flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of various aspects of the disclosure.

Figure 3:
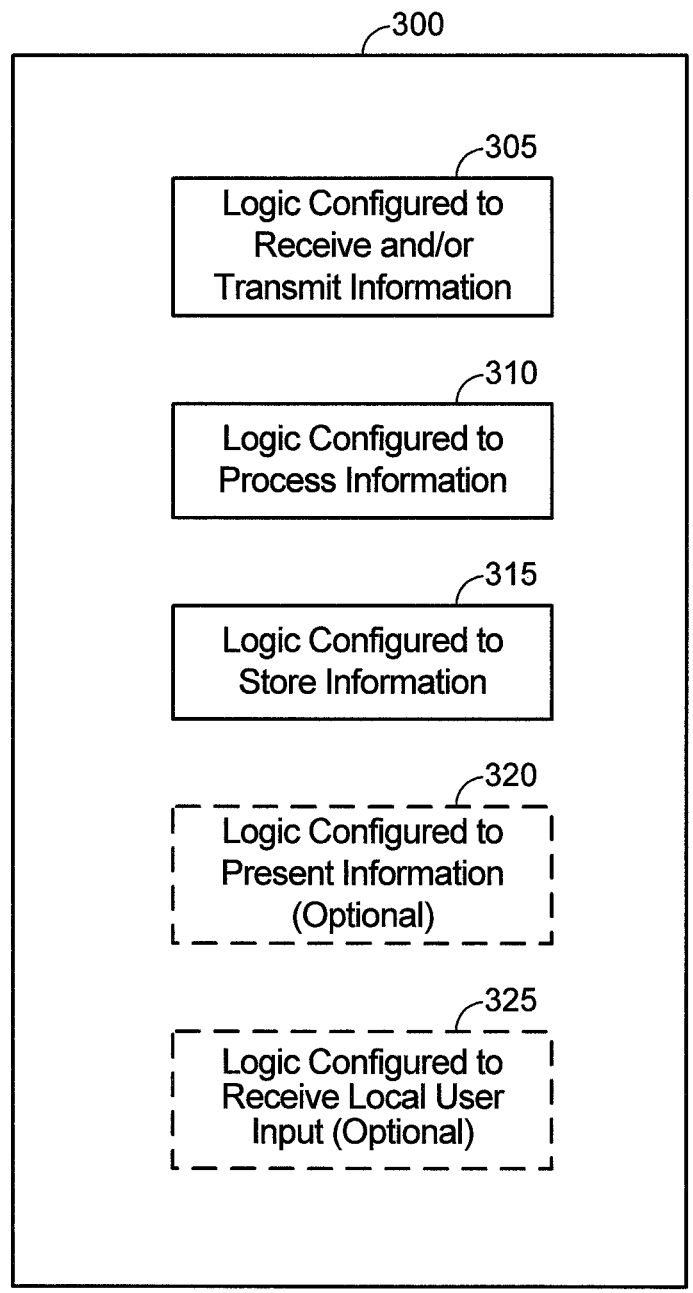
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the application server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Mobile UEs, such as cell phones, smart phones, tablet computers, laptops, PDAs, etc., are often capable of connecting to local wireless networks, such as WLANs, WiFi networks, Bluetooth networks, etc. Such networks are often used to provide data connectivity for mobile devices. However, maintaining a connection while a UE is moving from one geographic area to another can be challenging.

Currently, UEs simply perform periodic scans when not-connected, and suppress all scans when connected. When connected, scans are suppressed to save energy, but this can hinder the ability of the UE to efficiently find and switch to a better access point (e.g. one with a higher signal-to-noise ratio (SNR)). When not connected, the rate of scanning is a tradeoff between power consumption and the delay of establishing a connection. This is especially an issue with moving UEs, where the best access point may be changing relatively quickly. For example, a UE may scan for local wireless networks while the user is driving, even though the UE will not be able to connect to a wireless network before the UE is out of range of that network. In another example, the UE may be stationary and not connected, in which case scanning for available wireless networks is unnecessary, at least after an initial scan.

Figure 4:
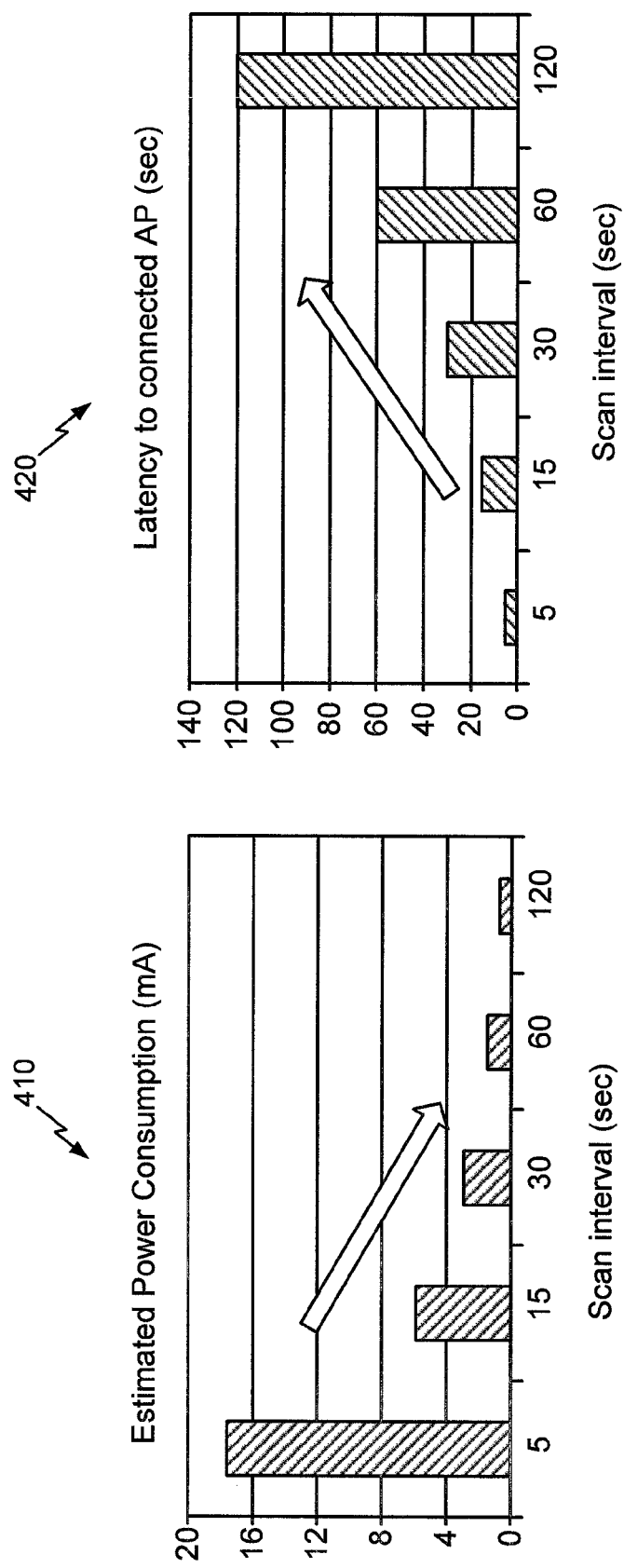
FIG. 4 illustrates exemplary graphs of the tradeoffs between power and latency.

FIG. 4 illustrates exemplary tradeoffs between power and latency. Graph 410 illustrates the power consumption (in mA) for scan intervals of 5, 15 30, 60, and 120 seconds. Graph 420 illustrates the latency to connect to an access point (in seconds) for scan intervals of 5, 15 30, 60, and 120 seconds. As can be seen, the shorter the scan interval, the higher the power consumption. However, the shorter the scan interval, the shorter the connection latency.

As shown, frequent scans can require significant power. However, when the UE is moving or is stationary but not connected, there is a reduced need to perform frequent scans. Thus, the motion state of the UE can be used to improve the power performance of the connectivity management. For instance, the motion state of the UE can be used to avoid unnecessary scans for available local wireless networks. The motion state classifier requires very little power, and thus is always on.

There are three broad motion states used to manage scans for local wireless networks.

First, if the UE is not connected and stationary, then scans are suppressed or slowed. The reason is that if the UE is not moving, then the access point signal strengths are unlikely to change significantly. Further, if a distance bound can be computed from the motion information, scans may be triggered only if the distance traveled exceeds a set threshold. This threshold can be set to optimize performance, and can be related to the coverage distance of the wireless network signals.

Second, if the UE is not connected and moving quickly (e.g. faster than a threshold), then scans are suppressed or slowed. The reason is that, since access points have limited range, if the UE is moving quickly enough, the UE is likely to be out of range before it can be detected and establish a connection (or the connection would be of such short duration as to be of no use).

Third, if the UE is connected and stationary, then scans are not likely to be needed (for connectivity purposes), and are suppressed or slowed. However, if motion is detected, then occasional scans may help the UE maintain connection with the best available access point. Further, a combination of signal strength and motion information can be used to determine the need for a scan. If the SNR for the connected access point is high, scans can be suppressed regardless of motion. However, if the SNR is low, scans can be triggered by motion, or by a distance traveled exceeding a set bound.

Certain UE states do not fall into the above three categories and should be addressed separately. For example, if the UE is stationary and a new, closer access point is turned on, the UE will not detect the new access point if it is not performing scans. This rarely happens, and can be addressed by the UE performing a long-interval heartbeat scan (e.g. 300 seconds) when it is stationary. Another example is that the UE may be connected to a mobile hotspot while "in transit." This can be addressed by treating mobile hotspots as a separate case. It can also be addressed by performing a long-interval heartbeat scan (e.g. 300 seconds).

To determine whether the UE is stationary or moving, the motion of the UE can be classified into eight motion states: walk, run, sit, stand, absolute rest, fiddle, in-transit, and null. "Fiddle" means the user is holding the UE. "In-transit" means the mobile device is travelling in any vehicle, such as an automobile, a train, a plane, etc. "Null" means that the motion classifier cannot reach a level of confidence in the motion classification necessary to report a motion state. These motion states can be determined by the UE's accelerometer only, which requires very little power.

These eight fine-grained motion states can be remapped to two coarse-grained motion states: stationary (sit, stand, fiddle, absolute rest) and non-stationary (walk, run, in-transit). These coarse-grained motion states cause two motion state change events—the UE can go from stationary to non-stationary, or from non-stationary to stationary.

There are several types of motion state change algorithms that can be used to determine the motion state of the UE. For example, the instant change detection (ICD) algorithm monitors consecutive motion states and detects any transition between stationary and non-stationary motion states (the algorithm ignores the null output). As another example, the cumulative sum control chart (CUSUM)-based change detection (CCD) algorithm accumulates and detects change upon crossing a maximum divided by two (e.g. the maximum may be 10 seconds). As yet another example, the CUSUM-based and collapse change detection (CCCD) algorithm detects change events within two minutes. This works because many of the CUSUM-based change events are generated within two minutes. The algorithm collapses, or combines, change events if they are generated within two minutes.

Motion change events can be determined from a function that uses the parameters "event type," "timestamp," and "metadata." The "event type" parameter can be a one-bit binary value that indicates whether or not the motion change event is a change from a "stationary" motion state to a "non-stationary" motion state. That is, a 1 can indicate a change from "stationary" to "non-stationary" and a 0 can indicate either no change or a change from "non-stationary" to "stationary." The timestamp parameter can be a four byte value that indicates the epoch time. The metadata parameter is optional, and can indicate the current motion state and/or a confidence level in the motion state change. The metadata parameter can include a three-bit field to indicate the motion state (three bits provides eight unique states) and four bytes for the confidence level. There is no need to consider the packet header size.

Figure 5:
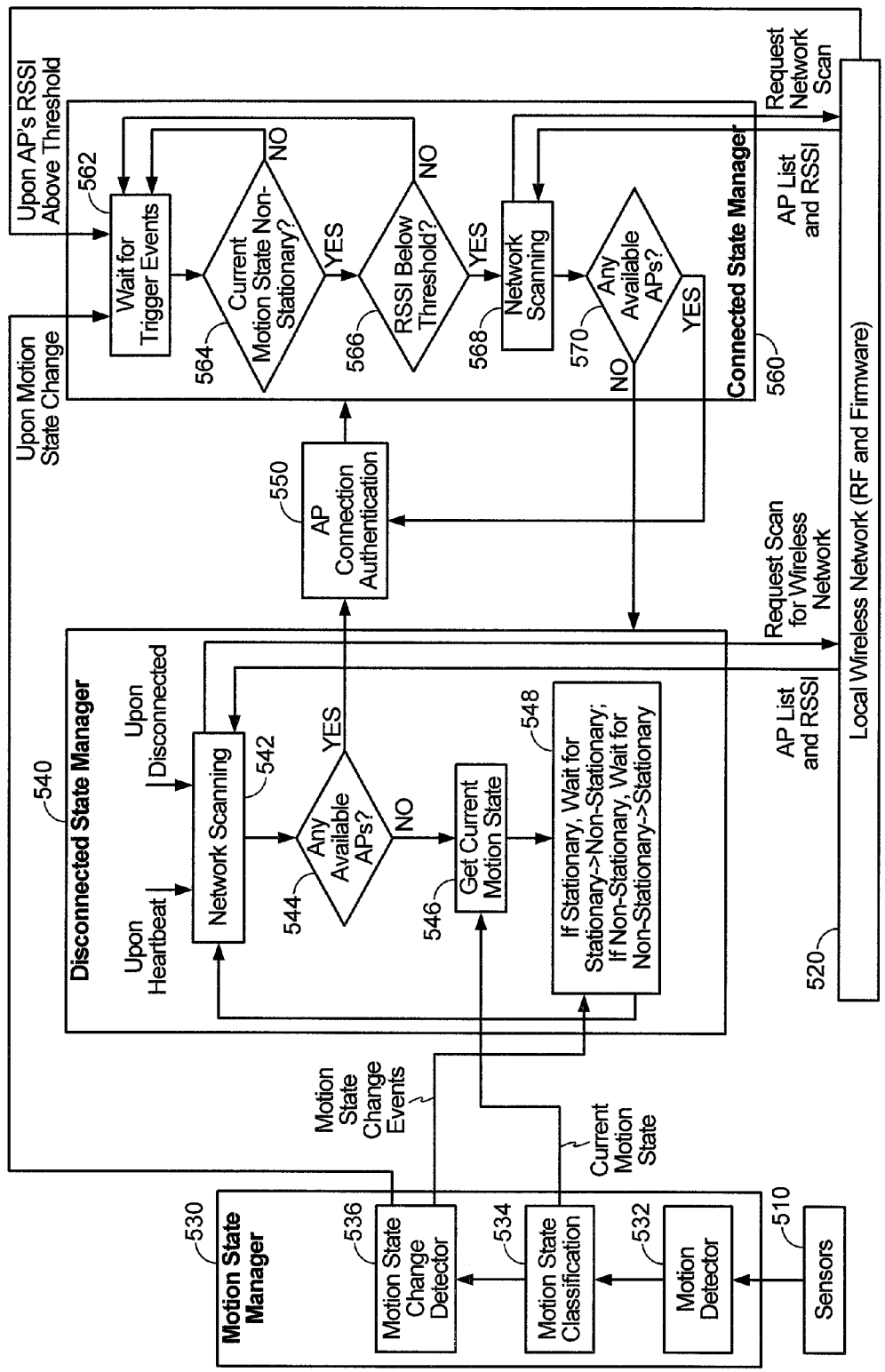
FIG. 5 illustrates an exemplary architecture of a UE according to at least one aspect of the disclosure.

FIG. 5 illustrates an exemplary architecture of a UE according to at least one aspect. The architecture illustrated in FIG. 5 includes a motion state manager 530 coupled to one or more sensors 510, a disconnected state manager 540, and a connected state manager 560. The disconnected state manager 540 and the connected state manager 560 are coupled to a local wireless network detector 520 for detecting local wireless networks. The local wireless network detector 520 may be an RF antenna and associated firmware.

Within the motion state manager 530, a motion detector 532 receives input from the sensor(s) 510. The motion detector 532 passes motion data to the motion state classifier 534, which classifies the motion as one of sitting, standing, fiddling, absolute rest, walking, running, or in-transit. The motion state classifier 534 passes the motion state to the motion state change detector 536, which determines whether or not the motion state of the UE has changed from a non-stationary motion state to a stationary motion state or from a stationary motion state to a non-stationary motion state.

The disconnected state manager 540 performs network scanning at 542. The disconnected state manager 540 scans for available local wireless networks upon a long-interval heartbeat trigger and/or upon detecting that the UE has disconnected from a local wireless network. The disconnected state manager 540 sends a request to the local wireless network detector 520 to scan for available wireless networks and, in response, receives a list of access points (referred to as APs in FIG. 5) and their associated received signal strength indication (RSSI) from the local wireless network detector 520.

At 544, the disconnected state manager 540 determines whether or not there are any available access points. If there are not, then at 546, the disconnected state manager 540 retrieves the current motion state of the UE from the motion state manager 530. At 548, the disconnected state manager 540 determines whether or not the UE is stationary based on the retrieved motion state. If it is, then the disconnected state manager 540 waits for the motion state to change from a stationary motion state to a non-stationary motion state. If, however, the UE is non-stationary, then the disconnected state manager 540 waits for the motion state to change from a non-stationary motion state to a stationary motion state. The disconnected state manager 540 detects a change from one motion state to another based on motion state change events received from the motion state manager 530. When the motion state changes, the flow returns to 542 to scan for available networks.

If, at 544, the disconnected state manager 540 determines that there is an available access point, then at 550, the UE performs access point connection authentication. Control then passes to the connected state manager 560.

The connected state manager 560 waits for trigger events at 562. The trigger events may occur upon a motion state change, as indicated by the motion state change detector 536, or upon an access point's RSSI rising above a threshold, as indicated by the local wireless network detector 520. At 564, the connected state manager 560 determines whether or not the current motion state is a non-stationary motion state. If it is not, then the flow returns to 562.

If the UE is in a non-stationary motion state, however, then, at 566, the connected state manager 560 determines whether or not the RSSI of the access point is below a threshold. If it is not, then the flow returns to 562. If the RSSI is below the threshold, however, then, at 568, the connected state manager 560 scans for other available networks. The connected state manager 560 sends a request to the local wireless network detector 520 to scan for available networks and, in response, receives a list of available access points and their corresponding RSSIs.

At 570, the connected state manager 560 determines if there are any available access points. If there are not, then control passes to the disconnected state manager 540. If there are, however, then the flow proceeds to 550, where the UE performs access point connection authentication.

Figure 6:
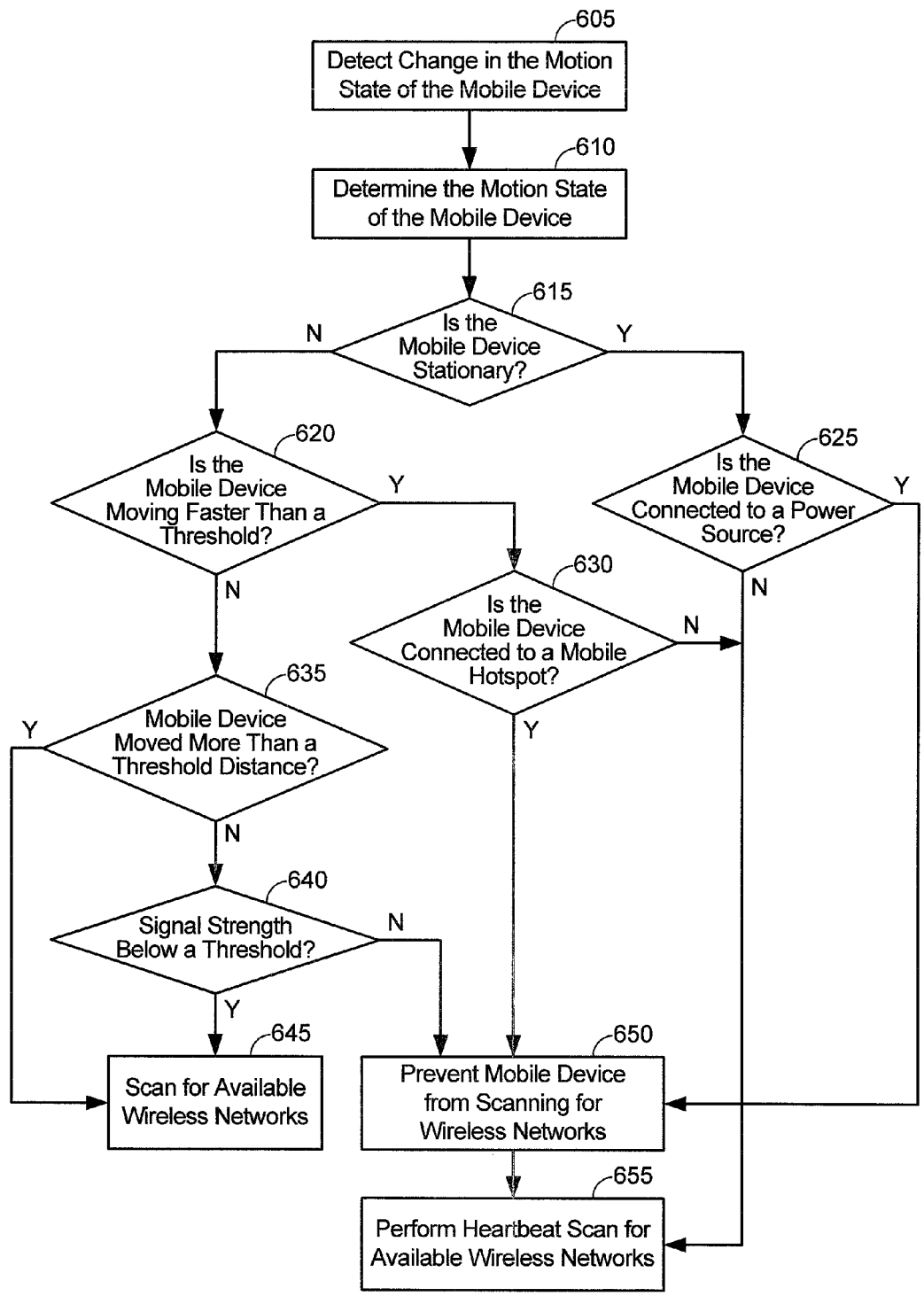
FIG. 6 illustrates an exemplary flow for using motion to improve local wireless network connectivity according to at least one aspect of the disclosure.

FIG. 6 illustrates a flow for using motion to improve local wireless network connectivity according to at least one aspect of the disclosure. At 605, a mobile device performing the flow detects a change in its motion state. At 610, the mobile device determines its motion state. As described above, the motion state may be one of walk, run, sit, stand, absolute rest, fiddle, in-transit, and null. At 615, the mobile device determines whether or not it is stationary. Here, "stationary" means that the motion state is one of sit, stand, fiddle, or absolute rest. If the mobile device is stationary, then at 625, the mobile device determines whether or not it is connected to an external power source, such as a wall outlet. If the mobile device is not stationary, then at 620, the mobile device determines whether or not it is moving faster than a threshold. The threshold may be based on the type of local wireless network to which the mobile device is connected, or is trying to connect, and the distance the mobile device can travel at its current speed. Thus, the threshold speed should be set such that the mobile device will have time to connect to a network before the mobile device passes out of range of the access point for that network. For example, if the local wireless network is a Wi-Fi network, the threshold may be such that the speed of a walking or running human would be less than the threshold and the speed of a driving automobile would be above the threshold.

If the mobile device is moving faster than the threshold (e.g. the user is driving), then at 630, the mobile device determines whether or not it is connected to a mobile hotspot. If the mobile device is not moving faster than the threshold (e.g. the user is walking or running), then at 635, the mobile device determines whether or not it has moved more than a threshold distance. If the mobile device has not moved more than the threshold distance, then at 640, the mobile device determines whether the signal strength of the wireless network to which it is connected (if it is connected) is below a threshold. If the mobile device has moved more than the threshold distance, then at 645, the mobile device scans for available local wireless networks. The threshold distance can be the approximate diameter of the type of local wireless network to which the mobile device is connected, or to which it is trying to connect. This may be a different threshold distance depending on the type of network.

If the signal strength is below the threshold, then at 645, the mobile device scans for available local wireless networks. If the signal strength is not below the threshold, then at 650, the mobile device prevents scanning for available local wireless networks.

Returning to 630, if the mobile device is connected to a mobile hotspot, then at 650, the mobile device prevents scanning for available local wireless networks. If the mobile device is not connected to a mobile hotspot, then at 655, the mobile device performs a periodic heartbeat scan for available local wireless networks. This can be a long-interval heartbeat scan, such as every 300 seconds.

Returning to 625, if the mobile device is connected to an external power source, then at 650, the mobile device prevents scanning for available local wireless networks. If the mobile device is not connected to an external power source, then at 655, the mobile device performs a periodic heartbeat scan for available local wireless networks.

Figure 7:
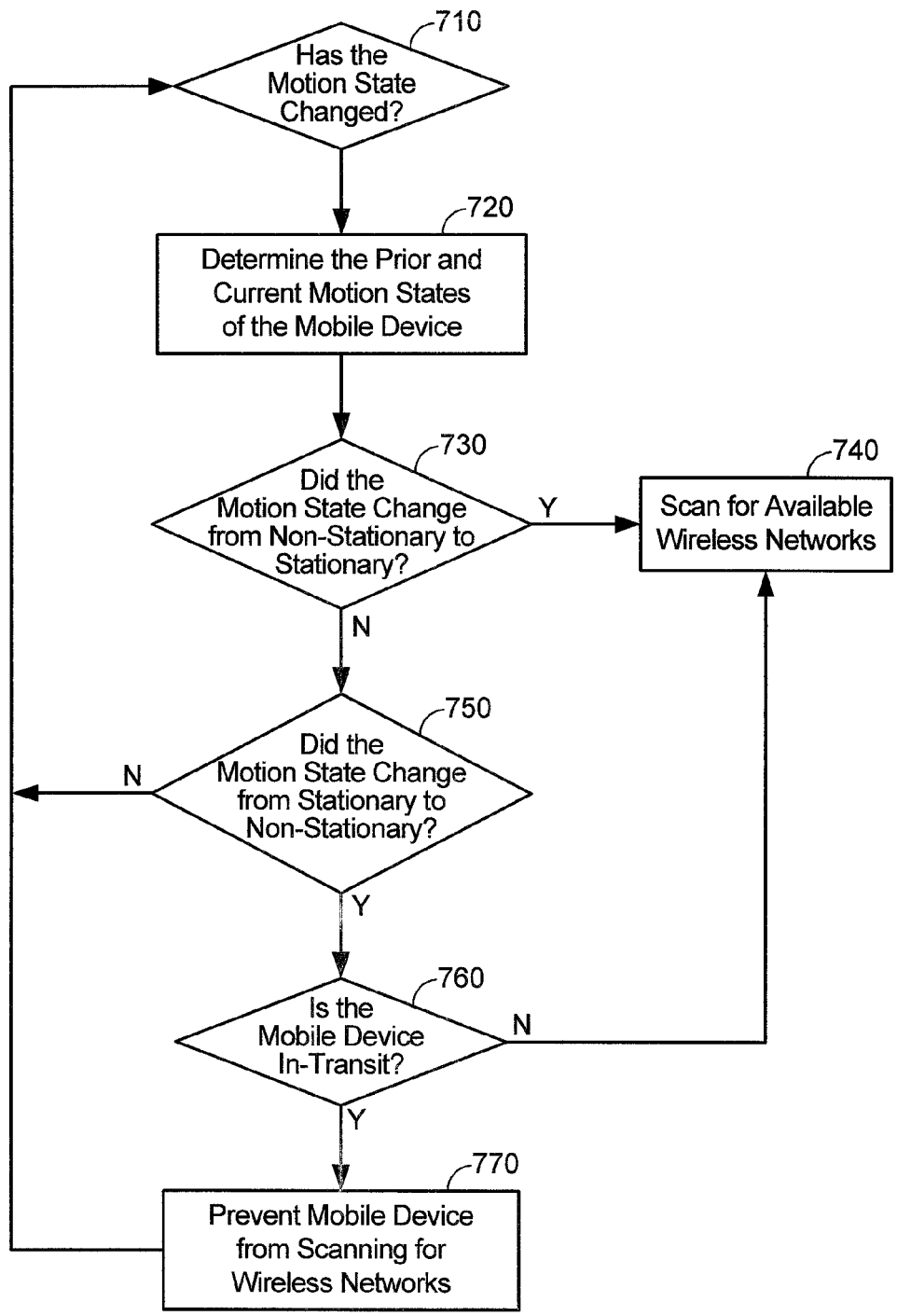
FIG. 7 illustrates an exemplary flow for using motion to improve local wireless network connectivity according to at least one aspect of the disclosure.

FIG. 7 illustrates a flow for using motion to improve local wireless network connectivity according to at least one aspect of the disclosure. At 710, a mobile device performing the flow determines whether or not a motion state of the mobile device has changed. The motion state may be one of sitting, standing, fiddling, absolute rest, walking, running, or in-transit. A stationary motion state may be a motion state of sitting, standing, fiddling, or absolute rest. A non-stationary motion state may be one of walking, running, or in-transit.

At 720, the mobile device determines the prior motion state and the current motion state. At 730, the mobile device determines whether the motion state of the mobile device changed from a non-stationary motion state to a stationary motion state. That is, the mobile device determines whether or not the motion state changed from one of walking, running, or in-transit to one of sitting, standing, fiddling, or absolute rest. If the motion state has changed from a non-stationary motion state to a stationary motion state, then at 740, the mobile device scans for an available local wireless network.

If, however, at 730, the motion state did not change from a non-stationary motion state to a stationary motion state, then at 750, the mobile device determines whether or not the motion state of the mobile device changed from a stationary motion state to a non-stationary motion state. That is, the mobile device determines whether or not the motion state changed from one of sitting, standing, fiddling, or absolute rest to one of walking, running, or in-transit. If the motion state has not changed from a stationary motion state to a non-stationary motion state, then the flow returns to 710.

If, however, at 750, the motion state has changed from a stationary motion state to a non-stationary motion state, then at 760, the mobile device determines whether or not the motion state is "in-transit." If the motion state is not "in-transit," then at 740, the mobile device scans for an available local wireless network. If, however, the motion state is "in-transit," then at 770, the mobile device prevents scanning for available local wireless networks. The flow then returned to 710.

When the motion state changes from a stationary motion state to a non-stationary motion state and the mobile device scans for an available local wireless network, the mobile device may not select the local wireless network with the strongest signal. Rather, it would be preferable for the mobile device to select the available local wireless network toward which it is moving, if the mobile device can identify that local wireless network. On the other hand, if the motion state of the mobile device changes from a non-stationary motion state to a stationary motion state and the mobile device scans for an available local wireless network, the mobile device should preferably select the available local wireless network with the strongest signal.

Motion state change events enable "low power communication" between the wireless local network subsystem and the sensor subsystem. Additionally, motion state change events occur infrequently, which further reduces power consumption.

Figure 8:
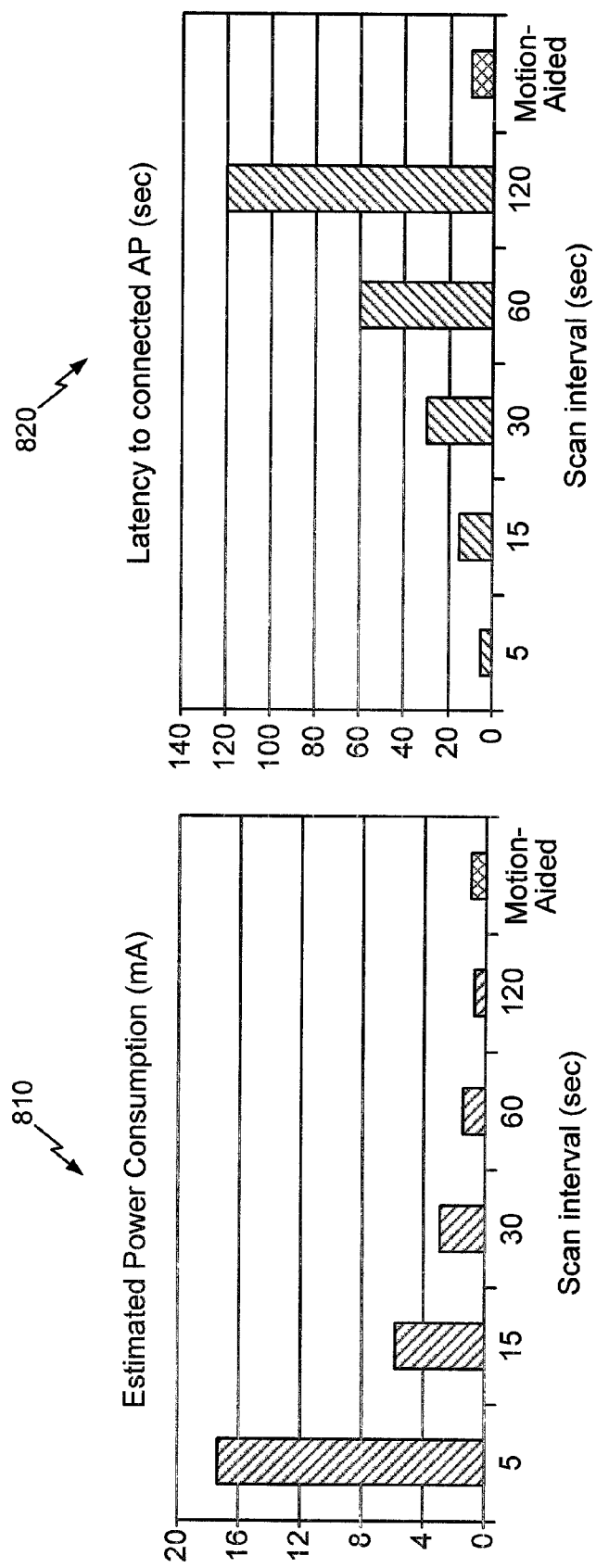
FIG. 8 illustrates exemplary graphs of the tradeoffs between power and latency for UEs using and not using the various aspects of the disclosure.

FIG. 8 illustrates exemplary tradeoffs between power and latency for UEs using and not using the various aspects of the disclosure, given a 10 second interval for reporting motion change events. That is, the motion state of the UE is reported every 10 seconds. Graph 810 illustrates the power consumption (in mA) for scan intervals of 5, 15 30, 60, and 120 seconds, as well as the power consumption for a motion-aided interval. Graph 820 illustrates the latency to connect to an access point (in seconds) for scan intervals of 5, 15 30, 60, and 120 seconds, as well as the latency for a motion-aided interval. As can be seen, the motion-aided scan interval has the lowest connection latency for the lowest power consumption.

In an aspect, rather than simply triggering a scan when the motion state changes from stationary to non-stationary or vice versa, a UE can use its motion state to perform additional scanning optimizations.

Figure 9:
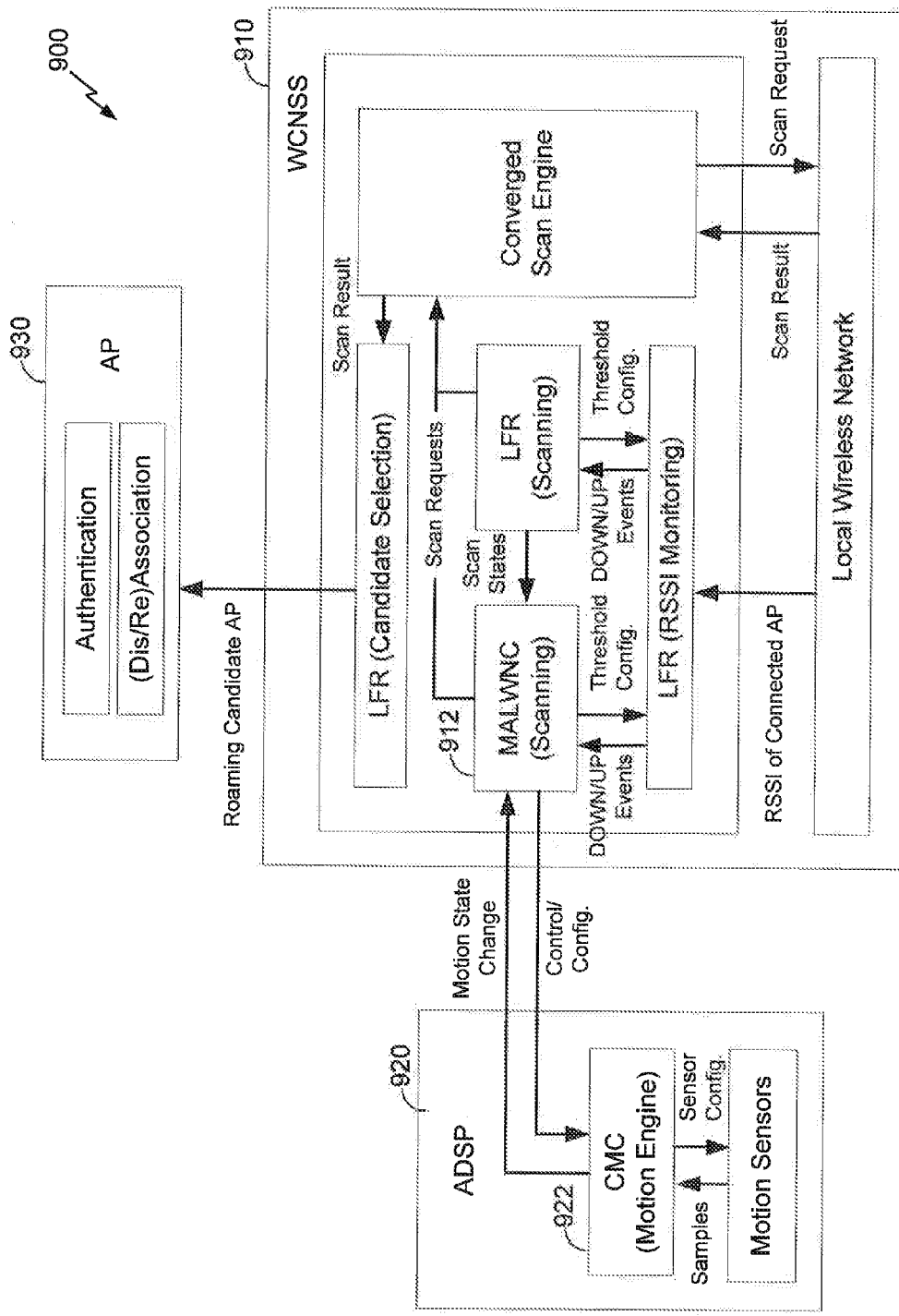
FIG. 9 illustrates an exemplary architecture according to an aspect of the disclosure.

FIG. 9 illustrates an exemplary architecture 900 according to an aspect of the disclosure. Previously, local wireless network roaming, such as WiFi roaming, was solely managed by the Legacy Fast Roaming (LFR) engine. The LFR on the WCNSS 910 monitors the RSSI(s) of the access point(s) to which the UE is connected. If an RSSI goes below a certain threshold, the LFR can trigger scans for local wireless networks based on its own algorithm. After a converged scan engine actually performs the scans, the LFR can select a roaming candidate access point (AP) 930 from the scan results. Finally, the host in the UE's application processor is responsible for association and authentication on the candidate access point.

In the architecture 900, the existing LFR is left "intact," and the motion-aided local wireless network connectivity (MALWNC) engine 912 triggers additional scans to improve performance by utilizing motion information. This ensures that roaming performance returns to the level of the LFR only if motion information is not available. Also, it can make each additional MALWNC scan logic switchable so that it can easily be added/removed without affecting the performance of the LFR.

For this purpose, the MALWNC 912 subscribes to motion state change events from the Coarse Motion Classifier (CMC) 922 on the advanced digital signal processor (ADSP) 920. The CMC 922 may correspond to the motion state manager 530 of FIG. 5 and/or may include the motion detector 532, the motion state classification 534, and/or the motion state change detector 536. The CMC 922 classifies motion states of the UE (e.g., Walk, Run, Stationary, Fiddle, In-Transit) every, for example, one second from 20 Hz, 3-axis acceleration samples. Then, it detects the changes of motion states (e.g., from Walk to Stationary states), whose rate is low in common (e.g., 100/day). Although the CMC 922 and the MALWNC 912 may run in different subsystems, they can communicate with each other directly via a direct link without requiring costly wakeups of the application processor.

Based on the RSSI of the access point to which the UE is connected, the LFR can operate in three different modes:
1) Connected with No Scan (if RSSI>$T_{LookUP}$): RSSI is very high and thus no scan is necessary.
2) Connected with Lookup Scan (if RSSI<=$T_{LookUP}$): RSSI is low enough and thus a lookup scan is necessary to find a candidate roaming access point.
3) Disconnected: RSSI is too low and thus disconnected. Once disconnected, the disconnected state is managed by the host (e.g., the operating system), which performs scans to reconnect to other access points.

A threshold $T_{LookpUP}$ is the connected access point RSSI threshold for roaming candidate lookup. A hysteresis of, for example, 5 dB can be applied to avoid needless triggering due to state transition between SCAN and WAIT states. That is, $T_{LookupUP}=T_{LookupDOWN}+5$ dB, for example.

Once a lookup scan is performed, the roaming candidate access point can be selected based on configured conditions. If a candidate is found, the host is informed and woken up for re-association and authentication. If not, the lookup scan can be continued or suspended depending on the scan algorithm.

The LFR may perform the following scan triggering algorithm. First, upon receiving a lookup DOWN event, the algorithm scans all channels in the occupied channel list (a.k.a. the channel cache). This is a split scan.

Second, if no candidates are found and the empty scan refresh period is non-zero, the algorithm fires a timer programmed to the configured value. Once the timer fires, the algorithm scans on all non-DFS channels in the valid list. This is a contiguous scan. If no candidates are found, this step is repeated. If, however, no candidates were found and the empty scan refresh period is zero, then the algorithm re-registers by lowering the lookup DOWN threshold by, for example, 3 dB.

Third, upon receiving the lookup DOWN event, the algorithm once again scans on all channels in the occupied channel list. This is a split scan. If no candidates are found, the algorithm immediately scans on all non-DFS channels in the valid list. This is a contiguous scan. If no candidates are found, the algorithm fires a timer programmed to a neighbor scan refresh period. Once the timer fires, the algorithm scans on all non-DFS channels in the valid list. This is a contiguous scan. If no candidates are found, the algorithm stops scanning.

Once the scan is finished, the list of access points and their RSSI values are passed to the LFR roam candidate selection module. Then, three conditions are checked to determine the roaming candidate:

1) The service set identifier (SSID) profile of a roaming candidate should be matched to registered profiles
2) The RSSI of a roaming candidate should be above a lookup threshold (e.g., $T_{Lookup}$)
3) The abs(RSSI of roaming candidate—current AP RSSI) should be greater than $T_{RoamRssiDiff}$ These conditions address the "access point ping ponging" case. This case can happen if the UE roams to a slightly better access point than the current one in terms of RSSI. After moving to the new access point, the UE may return to the old access point, and vice versa. The above conditions are a form of hysteresis, and help avoid this ping ponging.

The existing roaming engine (i.e., LFR) is currently well optimized to limit roaming power consumption, and performs very few scans in support of roaming. At the LFR's present performance, it may be difficult to further reduce the number of scans. Turning the focus to performance, there are aspects that can be improved by using motion context and a limited increase in power/scans that would be difficult to achieve without motion.

There are two motion-aided scanning performance optimizations that can be implemented by the MALWNC, referred to herein as LowRSSI and ContinuousWalk. The UE can periodically scan for available local wireless networks while it is "in motion" to reduce the latency of connecting to a new local wireless network. The phrase "in motion" (or "in-motion" or "inMotion") refers to a motion state of walk or run, and includes transitions between the two. That is, if the UE transitions from walk to run to walk, for example, the UE is considered to be "in motion" the entire time.

The LowRSSI optimization can be beneficial in the following case: the LFR permanently gives up on scanning for candidates if none are found in, for example, four scans after the RSSI goes below, for example, −78 dBm (i.e., three back-to-back scans followed by one additional scan after, for example, 20 seconds). Recovery in this case is achieved only if the RSSI improves, or through a disconnect/reconnect cycle (operating system controlled). To avoid disconnection, it requires frequent scans to find viable roaming candidate.

The ContinuousWalk optimization can be beneficial in the following case: while moving, the LFR does not fully utilize many access points in an enterprise setting. Accordingly, the data throughput of the LFR is lower than the achievable throughput. In addition, the LFR could fail to roam if the RSSI drops rapidly (e.g., when moving to a different floor via a stairway). To achieve better data throughput and to avoid disconnection, aggressive roaming is required while moving (e.g., change lookup threshold from −78 dBm to −68 dBm).

These motion-aided scanning performance optimizations consider three performance metrics. First, the long-term power delta in mA resulting from new logic is considered. Second, the likelihood of disconnect during a scenario of interest is considered. This performance metric is more important than data throughput in general. This metric is important for latency-sensitive VoIP applications. Currently, the LFR accepts, for example, a 5% disconnection ratio, that is, the number of disconnection per total roams. Third, the data throughput delta during scenarios of interest is considered. This performance metric is important for high data rate applications. Higher throughput could shorten transmissions of bursty data, enabling power saving. Currently, the LFR considers it good enough if the access point supports a data rate higher than, for example, 5 Mbps.

Table 1 summarizes MALWNC scan triggers in addition to LFR scan triggers. There are three types of scan triggering logic. Each trigger is designed to address one of the optimizations described above, and are orthogonal to each other. As such, each trigger can be enabled individually based on commercialization needs and importance.

TABLE 1

| Use Case | Optimization | Ramifications in roaming behavior | Performance impact |
| --- | --- | --- | --- |
| LowRSSI | Periodic scan after LFR_GIVEUP state if current motion = 'inMotion' | This scan helps to avoid disconnect when the user moves to a low RSSI condition and stays there for more than, e.g., 20 sec, then starts moving again | Avoid disconnect Some additional scans may cost additional power |

TABLE 1-continued

| Use Case | Optimization | Ramifications in roaming behavior | Performance impact |
|---|---|---|---|
| Continuous Walk | Scan upon $T_{walk}$ DOWN event AND current motion = 'inMotion' | LFR scans have stopped at this point This scan helps to roam to the BestAP while moving LFR does not try to scan since RSSI > $T_{lookup}$, so it may miss high RSSI APs while moving | Better data throughput while moving in an enterprise setting with many APs Avoid disconnect if RSSI drops rapidly (e.g., moving to different floor via stairs) Some additional scans and handovers may cost additional power |

Table 2 defines the terms used in Table 1 and elsewhere in this disclosure.

TABLE 2

| Terminology | Definition |
|---|---|
| LFR_GIVEUP state | The LFR state such that it performed, e.g., four scans and could not find a roaming candidate. If RSSI > $T_{LookupUP}$ OR disconnected, exit this state |
| inMotion | inMotion refers to the union of the "Walk" and "Run" motion states |
| $T_{walk}$ DOWN event | This event occurs when the RSSI of the connected AP goes below $T_{walk}$. $T_{walk}$ is the RSSI threshold to trigger a scan while moving $T_{walk}$ > $T_{lookup}$ and default value is, e.g., −68 dBm 5 dB hysteresis, e.g., is used to avoid needless triggering due to RSSI fluctuation. For example, $T_{walkUP}$ = $T_{walkDOWN}$ + 5 dB |
| MOTION STOP event | Refers to the motion state change from inMotion to a Stationary state Stationary state refers to both absolute rest and semi-rest states, such as sitting and standing |
| $T_{high}$ | RSSI threshold to trigger scan upon MOTION_STOP event $T_{high}$ > $T_{lookup}$ and default value is, e.g., −65 dBm |

In the LowRSSI optimization, frequent periodic scans are necessary to find roaming candidates since the access point to which the UE is connected is about to be disconnected (e.g., RSSI<−81 dBm). However, frequent scans may drain power. Thus, periodic scans can be enabled only when the motion state is "inMotion," thereby limiting the number of scans. Note that the percentage of time a UE is "inMotion" is typically low, for example, less than 5%.

Two parameters are associated with the scanning trigger. First, a time interval of the periodic scan ($T_{PS}$). The default value may be, for example, 5 seconds. Second, the maximum number of scans in a contiguous motion segment ($N_{retryLimit}$). This parameter is to avoid unnecessary scans in a single access point case. The default value may be, for example, four.

All the scans in the LowRSSI optimization are contiguous scans, since the previous split scans of the LFR failed to find a candidate. In other use cases, split scans are used since they are additional scans to improve data throughput.

Figure 10:
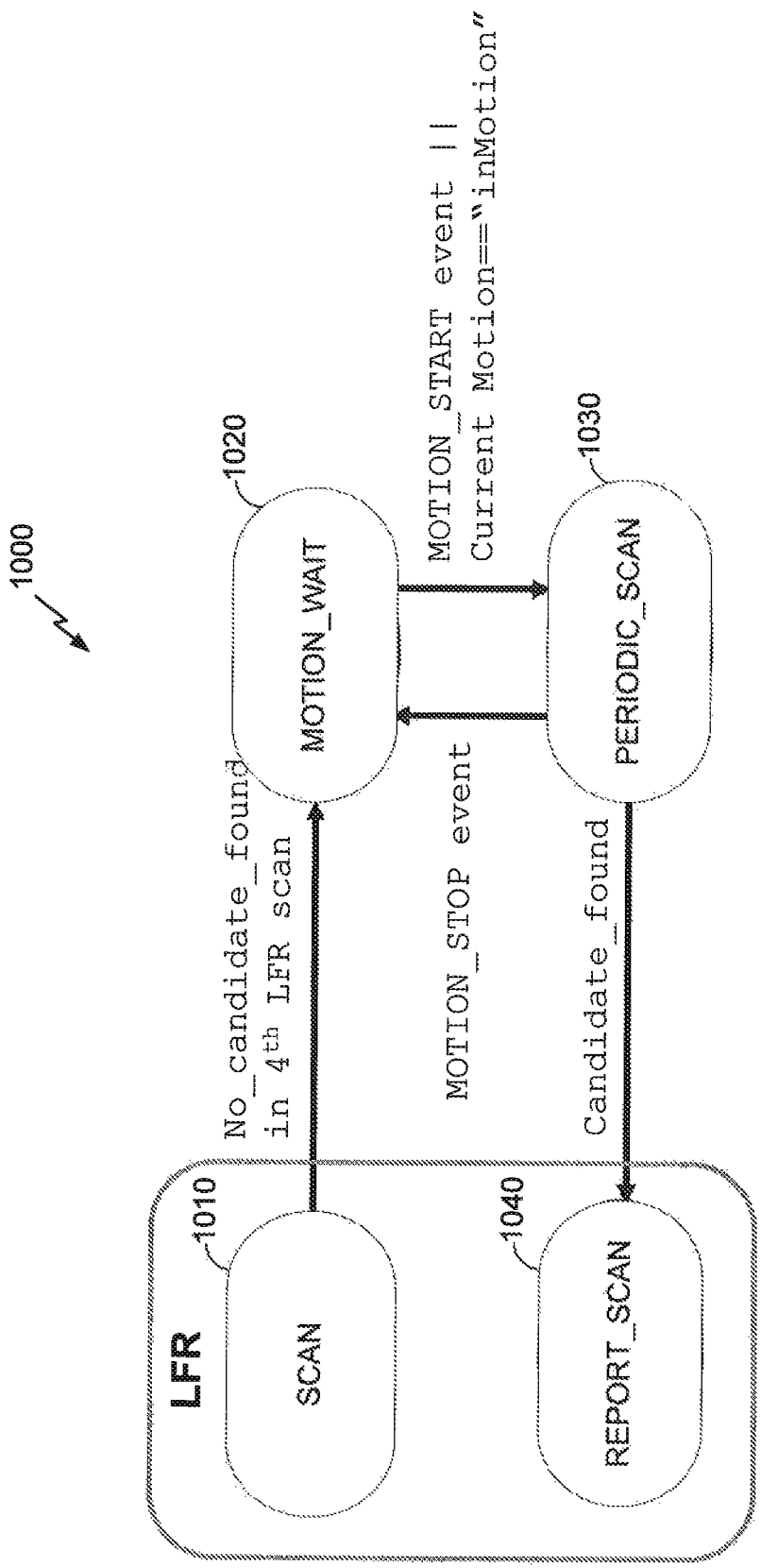

FIG. 10 illustrates an exemplary state diagram for scan triggering in the LowRSSI optimization. In the SCAN state 1010, if no_candidate in, for example, the fourth LFR scan, the state machine 1000 enters the MOTION_WAIT state 1020. In the MOTION_WAIT state 1020, if the current motion state is "in Motion," the state machine 1000 transitions to the PERIOIDC_SCAN state 1030 and scans after $T_{PS}$ (e.g., 5 sec). This is a contiguous scan. Otherwise, the state machine 1000 waits for a MOTION_START event. Upon this event, the state machine 1000 transitions to the PERIODIC_SCAN state 1030 and scans immediately. This is a contiguous scan.

If no_candidate_found in a scan result, the state machine 1000 keeps scanning every $T_{PS}$. This is a contiguous scan. Otherwise, the state machine 1000 transitions to the REPORT_SCAN state 1040.

The state machine 1000 stops scanning if the PeriodicScanCounter>$N_{retryLimit}$ (e.g., 4).

Upon a Lookup UP event (e.g., the RSSI has improved), the state machine 1000 transitions to the WAIT state in the LFR. Upon an HB failure event (e.g., a beacon was missed), the state machine 1000 transitions to the disconnected state.

FIG. 11 illustrates an exemplary flow for periodically scanning for available local wireless networks while in the inMotion state. At 1100, the UE determines its motion state using, for example, the motion detector 532 and motion state classifier 534 of FIG. 5. The UE may determine its motion state continuously or periodically, for example, every second or every time the periodic scan timer expires.

At 1110, the UE determines whether or not it is "in motion," that is, in a motion state of walking or running. If it is in motion, then at 1130, the UE determines whether or not a periodic scan timer has expired and/or an RSSI is below a threshold. If the periodic scan timer has not expired or the RSSI is not below the threshold, then the flow returns to 1100. At 1140, however, if the UE is in motion and the periodic scan timer has expired or the RSSI is below the threshold, the UE scans for an available local wireless network.

At 1150, the UE determines whether or not the scanning results in discovery of an available local wireless network. At 1160, if the scanning results in the discovery of an available local wireless network, the UE connects to the available local wireless network. If the scanning results in the discovery of multiple available local wireless networks, the UE may connect to the local wireless network with the highest RSSI. If the scanning does not result in the discovery of an available local wireless network, the UE resets the periodic scan timer and scans for a local wireless network upon expiration of the periodic scan timer.

At 1170, the UE determines whether or not a periodic scan counter is greater than a threshold. At 1190, if the periodic scan counter is greater than the threshold, the UE stops scanning for a local wireless network. However, at 1180, if the periodic scan counter is not greater than the threshold, then the UE increments the periodic scan counter.

If at 1110 the UE determines that it is not in motion, that is, in a motion state of sit, stand, absolute rest, fiddle, or null, then at 1120, the UE determines whether or not the previous motion state was an in-motion motion state. If it was not, then the flow returns to 1100. If it was, however, then the flow proceeds to 1140.

In another aspect of the disclosure, the UE can filter out unnecessary in-motion to stationary motion change events, thereby preventing unnecessary scans for available local wireless networks. For example, if a user frequently starts and stops walking in the same place, the UE will trigger a scan each time the user stops walking. However, since the user is still at the same location, the scan is unlikely to result in the discovery of a new local wireless network. To avoid such a case, the UE can adaptively filter out short in-motion segments. The filter threshold can be increased if no candidate local wireless network is found, or decreased if a candidate local wireless network is found.

FIG. 12 illustrates an exemplary flow for filtering unnecessary in-motion to stationary motion state change events. At 1210, the UE detects a motion state change event using, for example, the motion detector 532 and the motion state classifier 534 of FIG. 5.

At 1220, the UE determines whether or not the motion state changed from an in-motion motion state to a stationary motion state, that is, from a motion state of walking or running to a motion state of sitting, standing, absolute rest, fiddling, or null. If the motion state has not changed from an in-motion motion state to a stationary motion state, then the flow returns to 1210. Otherwise, the flow proceeds to 1230.

At 1230, the UE determines whether or not the difference between the time of the motion stop event (i.e., the motion state change from in-motion to stationary) and the time of the last motion start event (i.e., a motion state change from stationary to in-motion) is less than a cutoff threshold. If it is, then at 1240, the UE ignores this motion state change event and the flow returns to 1210. Accordingly, if the UE has not been in-motion for longer than the cutoff threshold, the UE ignores motion state change events and thereby suppresses scans for available local wireless networks.

If, however, at 1230, the UE determines that the difference between the time of the motion stop event and the time of the last motion start event is not less than the cutoff threshold, then at 1250, the UE scans for any available local wireless networks. Based on the scanning, at 1260, the UE determines whether or not it is still in the same place as the previous scan. If it is, then at 1270, the UE increases the cutoff threshold. If it is not, then at 1280, the UE decreases the cutoff threshold.

In both cases, the flow returns to 1210. Accordingly, if the UE has been in motion for longer than the cutoff threshold but is still in the same place, the cutoff threshold is too short. If, however, the UE has been in motion for longer than the cutoff threshold and is no longer at the same place, the cutoff threshold is too long, as the UE may have missed available local wireless networks along the way.

As an example, the UE may increase the cutoff threshold at 1270 by incrementing a cutoff counter and using it to retrieve the next value of a cutoff matrix that specifies minimum, maximum, and one or more intermediate values of the cutoff threshold. The UE may set the cutoff counter to the smaller of the cutoff counter plus one or the size of the cutoff matrix, thus preventing the cutoff counter from having a value larger than the size of the cutoff matrix. The UE can then set the cutoff threshold to the value of the cutoff matrix corresponding to the value of the cutoff counter. For example:

CutoffCounter=MIN(CutoffCounter++, size(Cutoff_Matrix));

Cutoff Threshold=Cutoff_Matrix(CutoffCounter), where Cutoff_Matrix=[5 10 15] seconds.

Note that the first value of the cutoff matrix, or Cutoff_Matrix(1), should not be zero, so as to always filter very short periods of motion. In the example above, the value of Cutoff_Matrix(1) is five seconds, which means that in-motion periods of less than five seconds are always filtered out. Further, when the UE is disconnected from a local wireless network, the cutoff counter should be reset to one.

In a similar way, the UE may decrease the cutoff threshold at 1280 by decrementing the cutoff counter and using it to retrieve the next value of the cutoff matrix. The UE may set the cutoff counter to the larger of the cutoff counter minus one or one, thus preventing the cutoff counter from having a value smaller than one. The UE can then set the cutoff threshold to the value of the cutoff matrix corresponding to the value of the cutoff counter. For example:

CutoffCounter=MAX(CutoffCounter--, 1);

Cutoff Threshold=Cutoff_Matrix(CutoffCounter), where Cutoff_Matrix=[5 10 15] seconds.

There are several methods the UE can use to determine whether or not it is in the same place in 1260. For example, the UE can use an available local wireless network selection-based method. In this method, once a scan is finished, the UE compiles a list of available access points and their respective RSSI values to check three conditions. First, for each available network, the UE determines whether or not the service set identifier (SSID) profile of the network matches a registered SSID profile. Next, the UE determines whether or not the RSSI of the available network is above a lookup threshold. Finally, the UE determines whether or not the absolute value of the RSSI of the available network minus the RSSI of the network to which it is currently connected, if any, is greater than a threshold. Each of these determinations should be "yes." If any of these determinations are "no," the UE is considered to be in the same place. Otherwise, it is considered to be a different place.

As another example, the UE can use a local wireless network signal distance-based method. In this method, once the scan is finished (i.e., scan A), the UE measures the local wireless network signal distance of the last scan (i.e., scan B) using the Tanimoto distance.

The Tanimoto distance D is [0 1]. The Tanimoto distance between two feature vectors ($FV_A$ and $FV_B$) is defined as:

$$\frac{FV_A \cdot FV_B}{\|FV_A\|^2 + \|FV_B\|^2 - FV_A \cdot FV_B}$$

The distance for local wireless network point of reference (PoR) clustering is defined based on the RSSI values of all access points:

$$\frac{\sum_{i=1}^{n} a_i b_i}{\sum_{i=1}^{n} a_i^2 + \sum_{i=1}^{n} b_i^2 - \sum_{i=1}^{n} a_i b_i},$$

where $a_i = (RSSI_i + 101)$ of $FP_A \in [0101]$,
$b_i = (RSSI_i + 101)$ of $FP_B \in [0101]$ $RSSI_i$ corresponds to the ith access point, $FP_A$ corresponds to an active local wireless network scan from instant A, and $FP_B$ corresponds to an active local wireless network scan from instant B.

If the distance between the current scan (i.e., scan A) and the previous scan (i.e., scan B) is less than a threshold (e.g., $T_{same}$), the UE determines that it is in the same place. If, however, the distance between the current scan and the previous scan is greater than a threshold (e.g., $T_{different}$), the UE determines that it is in a different place. If the UE cannot make either determination, it does nothing. The different place threshold (i.e., $T_{different}$) should be greater than or equal to the same place threshold (i.e., $T_{same}$).

In an aspect, the UE can filter out unnecessary drive to stationary motion state change events. For example, if a user frequently stops in traffic while driving, at traffic lights or in stop-and-go traffic, for example, the UE may trigger a scan each time the user has to stop moving. However, since the user is still driving, any scans would be unnecessary and the UE should be prevented from scanning for available local wireless networks. To accomplish this, the UE can ignore changes between the drive and stationary motion states except for the first change. The UE can begin scanning again when its motion state changes to a motion state other than driving or stationary, for example, walking.

FIG. 13 illustrates an exemplary flow for filtering unnecessary drive to stationary motion state change events. At 1310, the UE detects a motion state change event using, for example, the motion detector 532 and the motion state classifier 534 of FIG. 5.

At 1320, the UE determines whether or not the motion state changed from a driving motion state to a stationary motion state, that is, a motion state of sitting, standing, absolute rest, or fiddling. If the motion state did change from a driving motion state to a stationary motion state, then at 1330, the UE determines whether or not this is the first time the motion state changed from a driving motion state to a stationary motion state. If it is, then at 1360, the UE scans for any available local wireless networks. If it is not, however, then at 1340, the UE ignores the change in motion state, thereby suppressing unnecessary scans.

If, at 1320, the motion state has not changed from a driving motion state to a stationary motion state, then at 1350, the UE determines whether or not the motion state changed from a motion state of driving or stationary to another motion state, that is, from a motion state of driving, sitting, standing, absolute rest, or fiddling, to a motion state of walking, running, or null. If it has not, the flow returns to 1310. Otherwise, the flow proceeds to 1350, where the UE scans for any available local wireless networks.

In the various aspects, the UE can still perform a periodic heartbeat scan in case it misses a motion state change that would otherwise trigger a scan for available local wireless networks. In the walking aspect, the heartbeat scan may be performed every five minutes, for example, while in the driving aspect, the heartbeat scan may be performed every 20 minutes, for example.

FIG. 14 illustrates an exemplary state diagram for using motion to reduce unnecessary scans for local wireless networks. The corresponding state machine may be implemented on a UE, such as UE 200A or 200B, or the communication device 300.

MOTION_WAIT State 1410:
Upon receiving a LOOKUP_DOWN_NOTIFICATION, transition from the MOTION_WAIT state 1410. If the current state is "NOT_IN_MOTION," wait for a MOTION_START_EVENT. Upon receiving a MOTION_START_EVENT, or if the current motion state is "IN_MOTION," transition to the MOTION_DETECT state 1420.

MOTION_DETECT State 1420:
Upon entering this state, start a MOTION_TIMER, which may be, for example, 15 seconds. Once the timer expires (i.e., MOTION_TIMER_EXPIRY_EVENT), transition to the PERIODIC_SCAN state 1430. Upon receiving a MOTION_STOP event, run a MOTION_STOP cutoff algorithm, described below, and stop and remove the MOTION_TIMER if it exists.

A motion stop cutoff algorithm is used to filter out unnecessary in-motion to stationary motion change events:

[Step 1] Upon entering the INIT state, reset CutoffCounter = 1
[Step 2] Upon receiving a MOTION_STOP event, check its cutoff
    IF |MOTION_STOP$_{time}$ − MOTION_START$_{time}$| <
        CuttoffThreshold, Ignore this event for scan
        Transition to MOTION_WAIT state 1410
    ELSE do ONE_SHOT_SCAN 1440
        IF (no candidate found), CutoffCounter = MIN(CutoffCounter++, 3)
        ELSE, CutoffCounter = MAX(CutoffCounter−−, 1)
    CutoffThreshold = CutoffMatrix(CutoffCounter) where
    CutoffMatrix = [5 10 15] (sec)

In the algorithm above, the various numerical values, such as 1, 3, 5, 10, 15, are exemplary, and neither the disclosure nor the algorithm are limited to or by these values.

PERIODIC_SCAN State 1430:
Step 1. Upon entering this state, scan all channels in the occupied channel list (a.k.a. channel cache). This is a split scan.

Step 2. If no candidate is found, start a timer programmed to the configured value with an exponential backoff (e.g., the MOTION_BACKOFF timer). For example: exponent=2, minTime=30 seconds, maxTime=240 seconds.

Step 3. Upon receiving a MOTION_BACKOFF_TIMEOUT_EVENT, scan on all non-DFS channels in the valid list. This is a contiguous scan.

Step 4. Upon receiving a MOTION_STOP_EVENT, stop and remove the MOTION_BACKOFF timer and transition to the ONE_SHOT_SCAN state 1440.

ONE_SHOT_SCAN State 1440:
Step 1. Upon entering this state, scan all channels in the occupied channel list. This is a split scan.

Step 2. If no candidates are found in the split scan, scan on all non-DFS channels in the valid list. This is a contiguous scan.

Step 3. After the contiguous scan is completed, transition to the MOTION_WAIT state if no candidates found.

The following is a list of event handling changes:

WLAN_START_ROAM_CANDIDATE_LOOKUP_REQ: In the scan state, this event is ignored.

LOOKUP_DOWN_NOTIFICATION: On receiving this event, transition/enter the SCAN state from the WAIT state. The scan sub-state state-machine enters the MOTION_WAIT state.

LOOKUP_UP_NOTIFICATION: On receiving this event, exit the SCAN state regardless of the current sub-state. All SCAN sub-state state variables are reset and any timers are stopped.

ROAM_CANDIDATE_FOUND: This event can be generated while in the PERIODIC_SCAN state 1430 or the ONE_SHOT_SCAN state 1440. Exit the scan state when this event is received. All SCAN sub-state state variables are reset and any timers are stopped.

WLAN_HAL_INIT_SCAN_REQ_FROM_HOST: This event triggers a transition to a PAUSE state from the SCAN state. All SCAN sub-state state variables are reset and any timers are stopped.

WLAN_HAL_FINISH_SCAN_RSP: If in the PAUSE state, transition to the SCAN state and into the MOTION_DETECT sub-state. If in the SCAN state and in the PERIODIC_SCAN sub-state 1430, use the event to advance the algorithm (self-transition). If in the SCAN state and the ONE_SHOT_SCAN sub-state 1440 and this was the output from the last scan, transition to the MOTION_WAIT state.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for using motion to reduce scans for local wireless networks, comprising:
   determining whether or not a motion state change event of a user device indicates a change from a moving motion state to a stationary motion state; and
   based on the motion state change event indicating the change from the moving motion state to the stationary motion state and a difference between a time of the motion state change event and a time of a previous motion state change event being less than a cutoff threshold, ignoring the motion state change event, wherein ignoring the motion state change event comprises suppressing scanning for a local wireless network.

2. The method of claim 1, wherein the moving motion state is one of a walking motion state or a running motion state.

3. The method of claim 2, wherein ignoring the motion state change event comprises:
determining whether or not the difference between the time of the motion state change event and the time of the previous motion state change event is less than the cutoff threshold.

4. The method of claim 2, further comprising:
determining whether or not the difference between the time of the motion state change event and the time of the previous motion state change event is less than the cutoff threshold; and
based on the difference between the time of the motion state change event and the time of the previous motion state change event not being less than the cutoff threshold, scanning for a local wireless network.

5. The method of claim 4, further comprising:
determining whether or not the user device is located at a same location at which it was located during a previous scan for a local wireless network.

6. The method of claim 5, further comprising:
based on the user device being located at the same location, increasing the cutoff threshold; and
based on the user device not being located at the same location, decreasing the cutoff threshold.

7. The method of claim 6, wherein the increasing comprises:
increasing the cutoff threshold based on a cutoff matrix that specifies a minimum, a maximum, and one or more intermediate values of the cutoff threshold.

8. The method of claim 6, wherein the decreasing comprises:
decreasing the cutoff threshold based on a cutoff matrix that specifies a minimum, a maximum, and one or more intermediate values of the cutoff threshold.

9. The method of claim 5, wherein the determining whether or not the user device is located at the same location is based on one or more parameters of one or more local wireless networks discovered during the scanning.

10. The method of claim 1, further comprising:
determining whether or not a second motion state change event of the user device indicates a change from a moving motion state to a stationary motion state, wherein the moving motion state comprises a driving motion state; and
based on the second motion state change event indicating the change from the moving motion state to the stationary motion state, ignoring the second motion state change event.

11. The method of claim 10, wherein ignoring the second motion state change event comprises:
determining whether or not the second motion state change event is a first motion state change event from a moving motion state to a stationary motion state; and
based on the second motion state change event not being a first motion state change event from a moving motion state to a stationary motion state, ignoring the second motion state change event.

12. The method of claim 11, further comprising:
based on the second motion state change event being a first motion state change event from a moving motion state to a stationary motion state, scanning for a local wireless network.

13. The method of claim 10, further comprising:
based on the second motion state change event not indicating a change from a driving motion state to a stationary motion state, determining whether or not the second motion state change event indicates a change from a driving motion state or a stationary motion state to a non-stationary motion state or a non-driving motion state.

14. The method of claim 13, further comprising:
based on the second motion state change event indicating a change from a driving motion state or a stationary motion state to a non-stationary motion state or a non-driving motion state, scanning for a local wireless network.

15. An apparatus for using motion to reduce scans for local wireless networks, comprising:
logic configured to determine whether or not a motion state change event of a user device indicates a change from a moving motion state to a stationary motion state; and
logic configured to ignore the motion state change event based on the motion state change event indicating the change from the moving motion state to the stationary motion state and a difference between a time of the motion state change event and a time of a previous motion state change event being less than a cutoff threshold, wherein the logic configured to ignore the motion state change event comprises logic configured to suppress scanning for a local wireless network.

16. The apparatus of claim 15, wherein the moving motion state is one of a walking motion state or a running motion state.

17. The apparatus of claim 16, wherein the logic configured to ignore the motion state change event comprises:
logic configured to determine whether or not the difference between the time of the motion state change event and the time of the previous motion state change event is less than the cutoff threshold.

18. The apparatus of claim 16, further comprising:
logic configured to determine whether or not the difference between the time of the motion state change event and the time of the previous motion state change event is less than the cutoff threshold; and
logic configured to scan for a local wireless network based on the difference between the time of the motion state change event and the time of the previous motion state change event not being less than the cutoff threshold.

19. The apparatus of claim 18, further comprising:
logic configured to determine whether or not the user device is located at a same location at which it was located during a previous scan for a local wireless network.

20. The apparatus of claim 19, further comprising:
logic configured to increase the cutoff threshold based on the user device being located at the same location; and
logic configured to decrease the cutoff threshold based on the user device not being located at the same location.

21. The apparatus of claim 20, wherein the logic configured to increase comprises:
logic configured to increase the cutoff threshold based on a cutoff matrix that specifies a minimum, a maximum, and one or more intermediate values of the cutoff threshold.

22. The apparatus of claim 20, wherein the logic configured to decrease comprises:

logic configured to decrease the cutoff threshold based on a cutoff matrix that specifies a minimum, a maximum, and one or more intermediate values of the cutoff threshold.

23. The apparatus of claim 19, wherein the logic configured to determine whether or not the user device is located at the same location is based on one or more parameters of one or more local wireless networks discovered during a scan for a local wireless network.

24. The apparatus of claim 15, further comprising:
logic configured to determine whether or not a second motion state change event of the user device indicates a change from a moving motion state to a stationary motion state, wherein the moving motion state comprises a driving motion state; and
logic configured to ignore the second motion state change event based on the second motion state change event indicating a change from a moving motion state to a stationary motion state.

25. The apparatus of claim 24, wherein the logic configured to ignore the second motion state change event comprises:
logic configured to determine whether or not the second motion state change event is a first motion state change event from a moving motion state to a stationary motion state; and
logic configured to ignore the second motion state change event based on the second motion state change event not being a first motion state change event from a moving motion state to a stationary motion state.

26. The apparatus of claim 25, further comprising:
logic configured to scan for a local wireless network based on the second motion state change event being a first motion state change event from a moving motion state to a stationary motion state.

27. The apparatus of claim 24, further comprising:
logic configured to determine whether or not the second motion state change event indicates a change from a driving motion state or a stationary motion state to a non-stationary motion state or a non-driving motion state based on the second motion state change event not indicating a change from a driving motion state to a stationary motion state.

28. The apparatus of claim 27, further comprising:
logic configured to scan for a local wireless network based on the second motion state change event indicating a change from a driving motion state or a stationary motion state to a non-stationary motion state or a non-driving motion state.

29. An apparatus for using motion to reduce scans for local wireless networks, comprising:
means for determining whether or not a motion state change event of a user device indicates a change from a moving motion state to a stationary motion state; and
means for ignoring the motion state change event based on the motion state change event indicating the change from the moving motion state to the stationary motion state and a difference between a time of the motion state change event and a time of a previous motion state change event being less than a cutoff threshold, wherein ignoring the motion state change event comprises suppressing scanning for a local wireless network.

30. A non-transitory computer-readable medium for using motion to reduce scans for local wireless networks, comprising:
at least one instruction to determine whether or not a motion state change event of a user device indicates a change from a moving motion state to a stationary motion state; and
at least one instruction to ignore the motion state change event based on the motion state change event indicating the change from the moving motion state to the stationary motion state and a difference between a time of the motion state change event and a time of a previous motion state change event being less than a cutoff threshold, wherein ignoring the motion state change event comprises suppressing scanning for a local wireless network.

\* \* \* \* \*